United States Patent [19]

Shimada et al.

[11] Patent Number: 4,909,210
[45] Date of Patent: Mar. 20, 1990

[54] VARIABLE SWIRL INTAKE APPARATUS FOR ENGINE

[75] Inventors: Taizo Shimada, Yokohama; Osamu Miyata; Tomoaki Tajima, both of Kawasaki; Shigeo Yazawa, Tokyo; Toshio Tsuda, Yokohama; Shuichi Komuro, Kawasaki; Eiji Mizote, Yokohama; Tomomi Nakagawa, Kawasaki, all of Japan

[73] Assignee: Mitsubishi Jidosha Kogyo Kabushiki Kaisha, Tokyo, Japan

[21] Appl. No.: 325,156

[22] Filed: Mar. 17, 1989

Related U.S. Application Data

[62] Division of Ser. No. 52,048, filed as PCT JP85/00465 on Aug. 23, 1985, published as WO87/01160 on Feb. 26, 1987, Pat. No. 4,834,035.

[30] Foreign Application Priority Data

| Mar. 23, 1984 | [JP] | Japan | 59-55313 |
| Mar. 26, 1984 | [JP] | Japan | 59-42972[U] |
| Mar. 26, 1984 | [JP] | Japan | 59-42971[U] |
| Apr. 13, 1984 | [JP] | Japan | 59-74692 |
| Aug. 14, 1984 | [JP] | Japan | 59-124142 |
| Aug. 14, 1984 | [JP] | Japan | 59-124143 |

[51] Int. Cl.$^4$ .............. F02B 31/00; F02B 35/10
[52] U.S. Cl. ................ 123/308; 123/188 M
[58] Field of Search .............. 123/306, 308, 188 M, 123/251

[56] References Cited

U.S. PATENT DOCUMENTS

| 4,438,741 | 3/1984 | Okumura et al. | 123/188 M |
| 4,617,896 | 10/1986 | Yoshikawa | 123/188 M |
| 4,699,104 | 10/1987 | Okumura | 123/308 |

FOREIGN PATENT DOCUMENTS

| 0071272 | 2/1983 | European Pat. Off. |
| 0168219 | 9/1984 | Japan | 123/188 M |

Primary Examiner—Willis R. Wolfe
Assistant Examiner—M. Macy
Attorney, Agent, or Firm—Hedman, Gibson, Costigan & Hoare

[57] ABSTRACT

Variable swirl intake apparatus (24) controls a swirl of intake air in cylinder chamber (22) of an engine. Variable swirl intake apparatus (24) has intake port (25) which has entrance portion (25a) formed on cylinder head (23) of the engine and extending from the side surface of cylinder head (23) and swirl chamber (25b) which communicates with entrance portion (25a) and is formed to provide a swirl to a gas flow flowing from entrance portion (25a), intake valve (26), arranged on the lower surface of cylinder head (23), for opening/closing between swirl chamber (25b) and cylinder chamber (22) of the engine, swirl control path (28), one end of which is open to swirl chamber (25a) on the side of entrance portion (25a) with respect to a line connecting the axis along a piston sliding direction at the center of cylinder chamber (22) and the axis of the intake valve, and the other end of which is open to the side surface of cylinder head (23), and a control apparatus (29) for controlling a gas flow into swirl control path (28). According to variable swirl intake apparatus (24), a swirl of a gas taken in the engine can be controlled in accordance with an operating condition of the engine so as to reduce $NO_x$ and a fuel consumption rate.

7 Claims, 23 Drawing Sheets

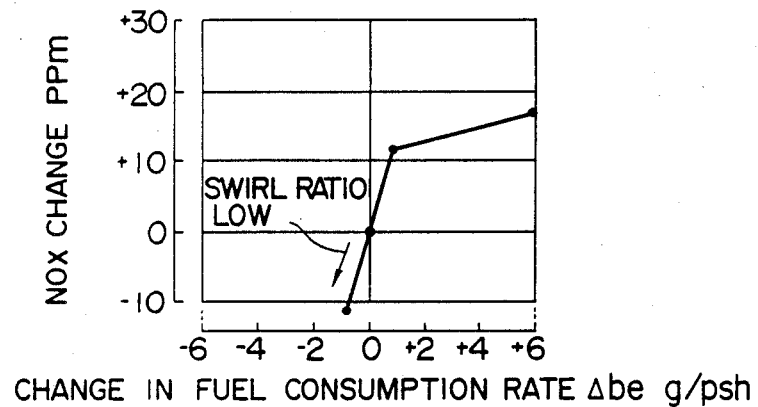
F I G. 33
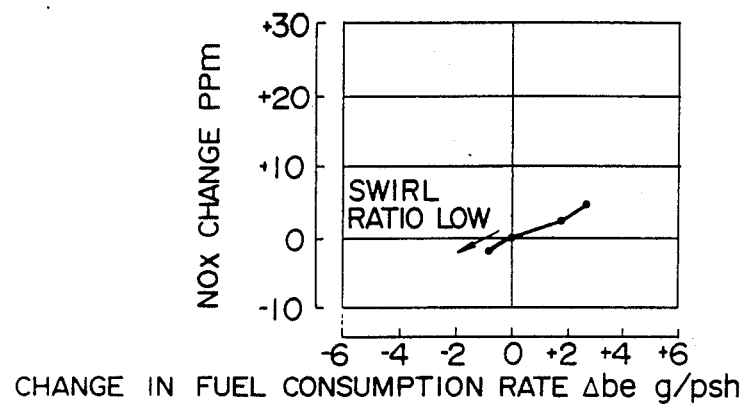
F I G. 34
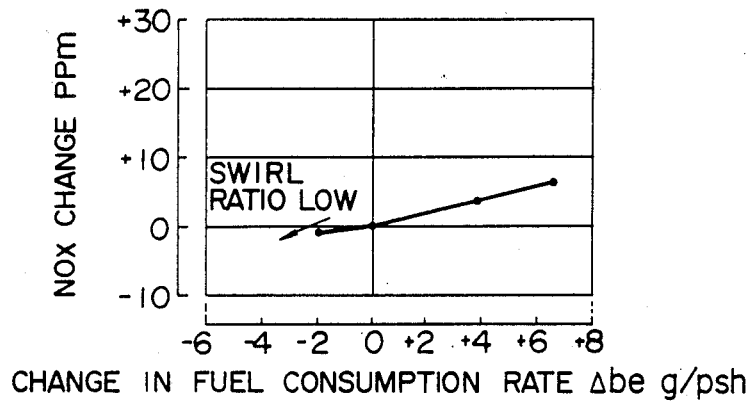
F I G. 35

VARIABLE SWIRL INTAKE APPARATUS FOR ENGINE

This is a divisional of application Ser. No. 052,048 filed as PCT JP 85/00465 on Aug. 23, 1985, published as WO87/01160 on Feb. 26, 1987, now U.S. Pat. No. 4,834,035.

TECHNICAL FIELD

The present invention relates to a variable swirl intake apparatus for an engine, for controlling a swirl of intake air in a cylinder chamber of, e.g., a direct injection type diesel engine.

BACKGROUND ART

An intake port for guiding air to a cylinder chamber is formed in a cylinder head of a direct injection type diesel engine, and an intake valve arranged in the intake port is opened or closed in response to each stroke of the engine.

Air guided from the intake port to the cylinder chamber is compressed, is mixed with fuel injected from an injection nozzle, and is then combusted. As is well known in this case, as air and fuel are mixed better, a combustion efficiency is improved.

Various means for improving the mixing state of air and fuel have been conventionally used. For example, a technique using a high swirl port (forcible swirl intake hole), a so-called HSP structure, is known.

The HSP structure is as shown in FIGS. 1, 2A, and 2B. Reference numeral 1 denotes a cylinder liner; 2, a cylinder chamber; 3, a cylinder head; and 4, an intake apparatus. Intake apparatus 4 is constituted by intake port 5 and intake valve 6. Reference numeral 7 denotes an exhaust port. A fuel injection nozzle (not shown) is arranged on cylinder head 3 to face cylinder chamber 2.

Intake port 5 is slightly eccentric to the center of intake valve 6. Upon intake stroke wherein intake valve 6 is mounted downward and intake port 5 is opened, intake air which receives "eccentricity" due to intake port 5 is guided to cylinder chamber 2, and a swirl is forcibly formed along the circumferential direction of chamber 2. Therefore, the intake air is mixed well with fuel-injected from an injection nozzle, and hence, a combustion efficiency can be improved.

Note that a ratio of a swirl speed of intake air in the cylinder chamber to a rotational frequency of an engine is called a "swirl ratio". The swirl ratio is preferably variable for the various reasons, as will be described later.

For example, when intake ports having different swirl ratios are alternately set on an identical cylinder chamber to compare engine performances, the experimental results shown in FIG. 3 are obtained. In FIG. 3, a curve indicated by a corresponds to the intake port having a high swirl ratio, a curve indicated by b corresponds to the intake port having a middle swirl ratio, and a curve indicated by c corresponds to the intake port having a low swirl ratio. As shown in FIG. 3, in the case of high swirl ratio a, when the engine speed is at low speed a1, the best engine performance can be obtained. In the case of middle swirl ratio b, when the engine speed is at middle speed b1, the best engine performance can be obtained. In the case of low swirl ratio c, when the engine speed is at high speed c1, the best engine performance can be obtained. Therefore, when the swirl ratio is constant, the performance is inevitably degraded in some engine speed range.

The reason, why the engine performance varies in accordance with a change in engine speed while the swirl ratio is constant, is as follows. More specifically, as shown in FIG. 4, when angle $\theta$ of spray flowing together with a swirl during fuel-injection period $\theta\text{inj}$ [degree: crank angle] in unit time coincides with angle $\theta 0$ between two adjacent sprays, the best engine performance can be obtained. If $\theta$ does not reach $\theta 1$, this means air between adjacent sprays is not satisfactorily utilized. Therefore, if $\theta$ exceeds $\theta 0$, the immediately preceding spray overlaps the next spray, the fuel is "baked" due to air shortage in this overlapping portion.

$$\theta 0 = 360°/n \tag{1}$$

[n: number of injection ports of nozzle]

$$\theta = (Ns/Ne)(B/D)\theta\text{inj} \tag{2}$$

[Ns: cylinder chamber air swirl speed [rpm], Ne: engine speed [rpm], (Ns/Nc): swirl ratio, B: cylinder bore diameter [mm], D: combustion chamber diameter [mm]]
For $\theta 0 = \theta$, $$360°/n = (Ns/Ne)(B/D)\theta\text{inj}$$

Therefore, $$\theta\text{inj} \times (Ns/Ne) = k \tag{3}$$

[K=constant]

In the relationship between injection period $\theta\text{inj}$ and engine speed Ne, as engine speed Ne increases, $\theta\text{inj}$ is prolonged, as shown in FIG. 5. Furthermore, as shown in FIG. 6, as engine speed Ne increases, the rotating speed of an injection pump is increased, and the injection pressure is increased, thereby shortening a time (injection time) required for injecting a predetermined quantity of fuel. However, as engine speed Ne increases, a crank angle in unit time (e.g., 1 ms) is also increased. As a result, as shown in FIG. 5, as the engine speed increases, the injection period is prolonged.

According to equation (3), the product of injection period $\theta\text{inj}$ and swirl ratio (Ns/Nc) is preferably constant K. For this purpose, as Ne increases and $\theta\text{inj}$ is prolonged, the swirl ratio is preferably small. Contrary to this, when the swirl ratio is constant, even if movement of a spray is matched to that of a swirl at given engine speed Ne1, $\theta\text{inj}$ is shortened when the engine speed is decreased below Ne1. Therefore, the swirl ratio becomes too small from equation (3), and the mixing state of fuel and air is impaired. When the engine speed is increased over Ne1, since $\theta\text{inj}$ is prolonged, the swirl ratio becomes too large from equation (3), and the immediately preceding spray overlaps the next spray, resulting in poor performance. In this manner, the swirl ratio is not always in proportion to the engine performance.

Engines of vehicles are subjected to the exhaust gas regulation. The amount of $NO_x$ (nitrogen oxides) produced as the major component of the exhaust gas is related to the swirl ratio, and the test results shown in FIG. 7 are obtained. More specifically, the amount of $NO_x$ produced is substantially proportional to the swirl ratio, and the higher the swirl ratio becomes, the amount of $NO_x$ produced is increased.

The engine is influenced by a load with respect to the engine speed. Therefore, the relationship between the load and the swirl ratio must be examined. In the case of low engine speed, the low swirl ratio is best suited, as described above (FIG. 3). However, as for the load, the low swirl ratio is preferable in the hatched portion shown in FIG. 8.

For example, if the load is light in the case of low speed, the high swirl ratio is not necessary and the low swirl ratio is best suited. At the middle speed, the low swirl ratio is preferably between the light load to middle load. At high speed, the low swirl ratio is best suited irrespective of a load state. More specifically, in the case of low speed and light load, this corresponds to a state of an excessive amount of intake air. Therefore, fuel can be combusted irrespective of the swirl ratio. In this state, the low swirl ratio causing a small amount of $NO_x$ produced is preferable rather than the high swirl ratio causing an increase in amount of $NO_x$ produced. As the swirl ratio is decreased, heat loss corresponding to a combustion gas absorbed by a cylinder wall is decreased. In particular, in the case of light load, the heat loss influences fuel consumption. Therefore, in this respect, the low swirl ratio is advantageous.

Conventionally, HSP structures having a low swirl ratio shown in FIG. 9A and having a high swirl ratio shown in FIG. 9B are separately prepared. In FIGS. 9A and 9B, reference numeral 2 denotes a cylinder chamber; 6a, an intake valve seat; 5a, a low swirl intake port; and 5b, a high swirl intake port. The sectional area of high swirl intake port 5b is decreased than that of low swirl intake port 5a. Each intake valve seat 6a is divided into eight sections along the circumferential direction, which are denoted by numbers 1 to 8. From each number position, intake air, which propagates in a direction indicated by an arrow and has a strength corresponding to the length of the arrow, is taken in cylinder chamber 2. Intake air vectos Nos. 1 to 4 tend to swirl clockwise (+) around center 0 of cylinder chamber 2, and are called forward swirl components. Intake air vectors Nos. 5 to 8 are inevitably swirl counterclockwise (−) opposite to the forward swirl direction due to the positional relationship between intake ports 5a and 5b and cylinder chamber 2, and are called reverse swirl components. In FIG. 9A, a difference between $$\sum_i Mi$$

obtained by adding swirl moments $Mi = Li \times Vi$ (as the product of length Li of the perpendicular drawn from center 0 to each intake air vector and magnitude Vi of the intake air vector) of the forward swirl components, and that of the reverse swirl components becomes relatively small, resulting in a low swirl ratio. In contrast to this, in FIG. 9B, the total of forward swirl moments becomes large since intake port 5b is tightened, and a difference between the total of the forward swirl moments and that of the reverse swirl moments becomes large, resulting in a high swirl ratio.

A conventional structure capable of variable swirl state is described in Japanese Patent Publication No. 51-7243. This structure is as shown in FIGS. 10A and 10B. In FIGS. 10A and 10B, reference numeral 12 denotes a cylinder chamber; 15, an intake port; and 16a, an intake valve seat. Intake port 15 is constructed on the basis of the low swirl port, and divided into ports 15a and 15b by partition wall 17. Port 15b can be opened/closed by opening/closing valve 18.

When opening/closing valve 18 is opened as shown in FIG. 10A, intake air is introduced into both ports 15a and 15b, and a flow rate passing intake valve seat 16a is low. Thus, cylinder chamber 12 is set in the low swirl state. When opening/closing valve 18 is closed, as shown in FIG. 10B, intake air is guided only to one port 15a. Therefore, the sectional area of an intake air path is decreased to half and becomes smaller than the inner diameter area of intake valve seat 16a, so that the flow rate of intake air is increased. Thus, cylinder chamber 12 is set in the high swirl state. Swirl components in both the states have directions and strengths corresponding to arrows in FIGS. 10A and 10B.

In the conventional structure of this type, the swirl ratio can be varied as needed, but the following problems are posed. More specifically, in the low swirl state, as shown in FIG. 11A, a single swirl like rigid-body swirl simply occurs in cylinder chamber 12. As shown in FIG. 11B, sprays F radially injected from the center of cylinder chamber 12 into the rigid-body swirl are simply influenced by side wind of rigid-body swirl. Therefore, sprays F cannot be sufficiently mixed with air. In the high swirl state, as shown in FIG. 11C, when intake air is guided into one port 15a and passes the edge of partition wall 17, a flow path area is immediately increased. Therefore, a plurality of swirls are formed due to separation, or a loss such as reverse flow occurs. Since the flow path sectional area is decreased to half and the sectional area of port 15a is small, a large flow path resistance occurs, and intake air can flow into cylinder chamber 12 only from a part of intake valve seat 16a. Therefore, a flow rate coefficient is low, and the amount of intake air becomes short.

As the basic idea about swirl, when the high swirl state is desired, intake air is preferably introduced from the horizontal direction (circumferential direction) with respect to the cylinder chamber. In this case, the amount of intake air is small. When the low swirl state is desired, intake air is preferably introduced from the vertical direction (axial direction) with respect to the cylinder chamber. In this case, the amount of intake air is large.

However, in the conventional structure shown in FIGS. 10A and 10B, intake port 15 is simply divided into two sections, and an intake direction cannot be changed upon switching of the swirl states. Thus, in either state, the amount of intake air is undesirably decreased.

Various other conventional structures have been proposed. However, the conventional structure cannot change the swirl state while maintaining a sufficient amount of intake air, and are complicate and high in cost.

DISCLOSURE OF INVENTION

It is an object of the present invention to provide a variable swirl intake apparatus for an engine, which can control a swirl of a gas taken in an engine in accordance with engine conditions so as to reduce $NO_x$ and to improve a fuel consumption rate.

The variable swirl intake apparatus comprises an intake port formed in a cylinder head of the engine and having an entrance portion extending from the side surface of the cylinder head and a swirl chamber which communicates with the entrance portion and is formed to provide a swirl to a gas flow introduced from the entrance portion, an intake valve arranged on the lower surface of the cylinder head, for opening/closing between the swirl chamber and a cylinder chamber of the engine, a swirl control path, one end of which is open to the swirl chamber on the side of the entrance portion with respect to a line connecting the axis along a piston sliding direction at the center of the cylinder chamber and the axis of the intake valve, and the other end of which is open to the side surface of the cylinder head, and a control apparatus for controlling a gas flow into the swirl control path.

With this arrangement, a gas flow from the swirl control path enters the swirl chamber on the side of the entrance portion with respect to the line connecting the axis along the piston sliding direction at the center of the cylinder chamber and the axis of the intake valve. Therefore, the gas flow has a moment for generating a reverse swirl in the cylinder chamber.

Therefore, when the gas flow enters the cylinder chamber from the swirl control path, the swirl in the cylinder chamber in weakened by the sufficient reverse swirl, and a gas flow also enters the cylinder chamber from the swirl control path. Thus, an intake amount is increased, satisfactory engine power can be obtained, and generation of $NO_x$ can be eliminated.

When an intake operation of a gas flow from the swirl control path to the swirl chamber is interrupted, the reverse swirl is sufficiently weakened, and a high swirl is generated in the cylinder chamber, thereby improving a fuel consumption rate.

BRIEF DESCRIPTION OF THE DRAWINGS

FIGS. 31 to 36 are views showing the relationship between an $NO_x$ change and a change in fuel consumption rate when swirl ratios at points a to e in FIG. 30 are changed, respectively.

BEST MODE FOR CARRYING OUT THE INVENTION

Figure 1:
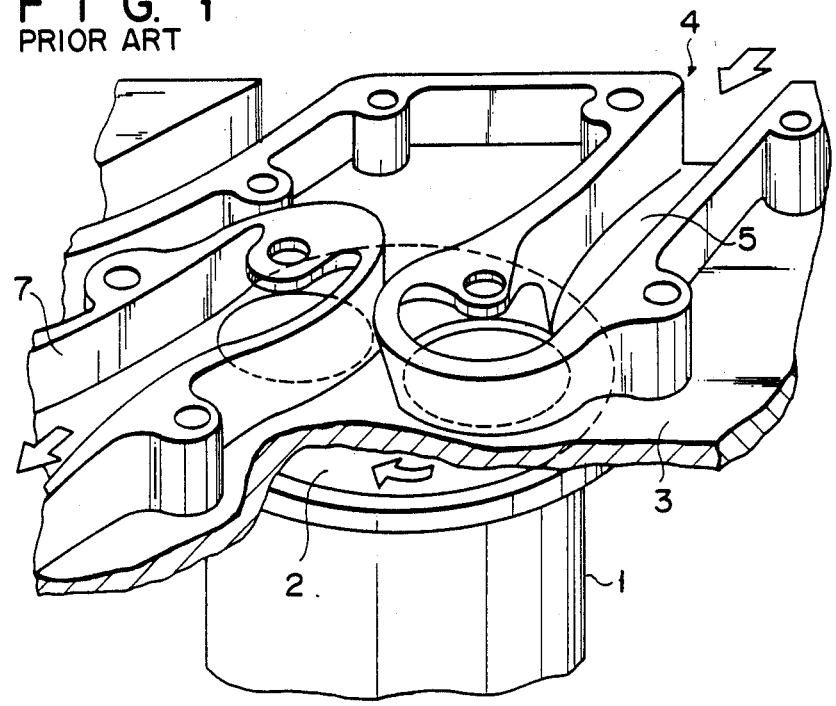
FIG. 1 is a perspective view of the main part of a conventional engine.
Figure 2A:
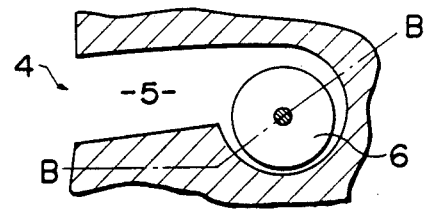
FIG. 2A is a cross-sectional view of an intake apparatus.
Figure 2B:
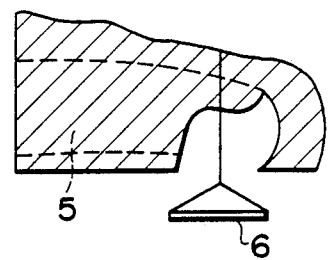
FIG. 2B is a longitudinal sectional view taken along line B—B in FIG. 2A.
Figure 3:
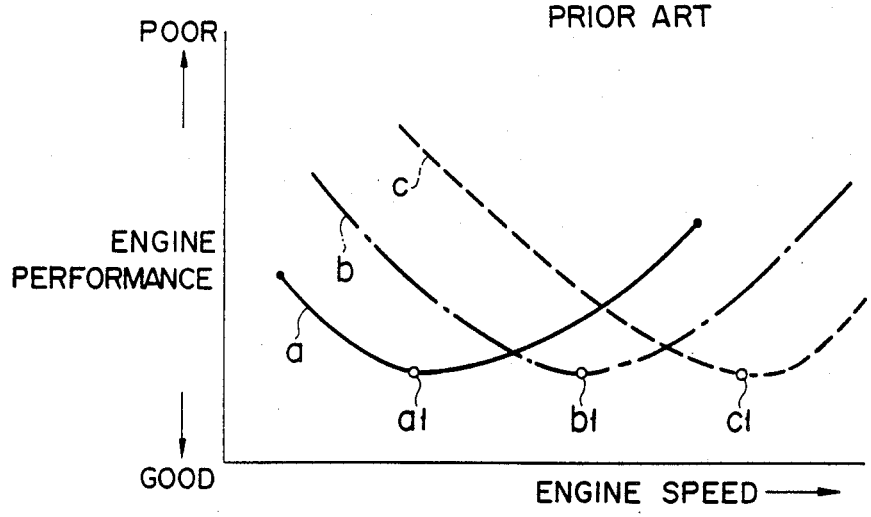
FIG. 3 is a view showing the relationship between a swirl ratio in a normal diesel engine and an engine speed.
Figure 4:
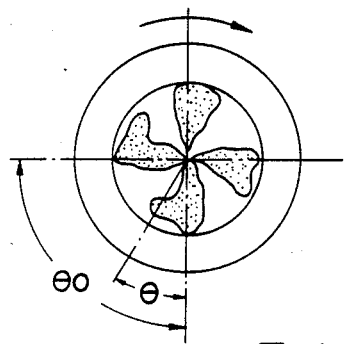
FIG. 4 is a view for explaining a fuel spray state.
Figure 5:
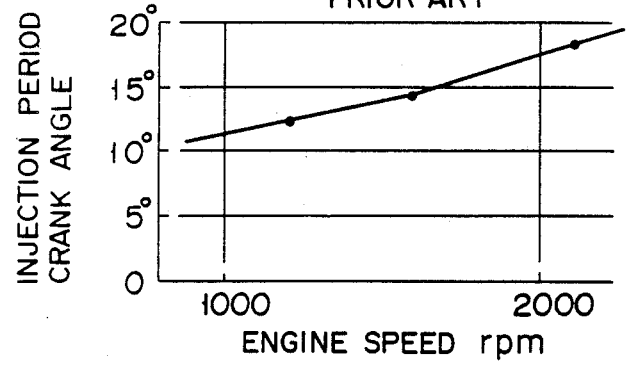
FIG. 5 is a view showing the relationship between an engine speed and an injection period.
Figure 6:
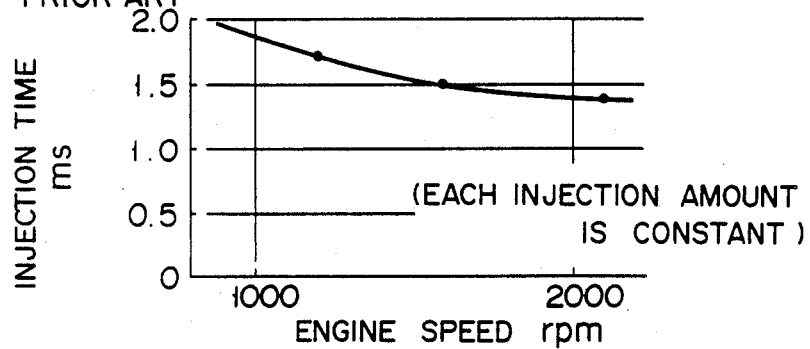
FIG. 6 is a view showing the relationship between an engine speed and an injection time.
Figure 7:
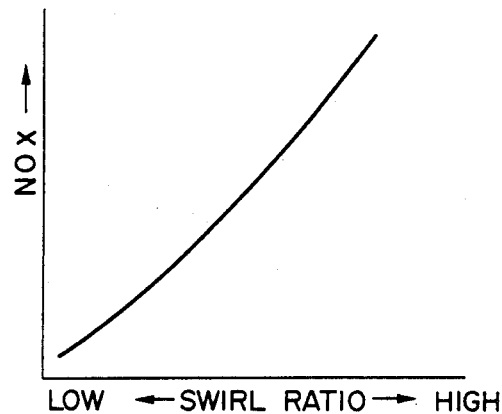
FIG. 7 is a view showing the relationship between a swirl ratio and an $NO_x$ generation state.
Figure 8:
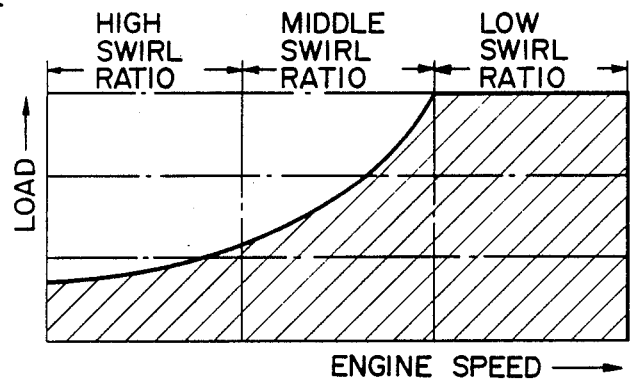
FIG. 8 is a view of an optimal load state showing the relationship between a swirl ratio and an engine speed.
Figure 9A:
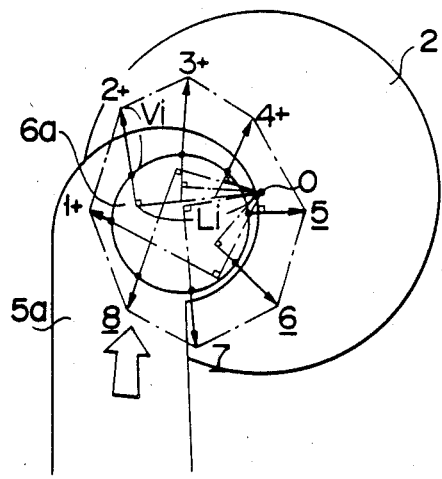
FIGS. 9A and 9B are views for explaining different swirl states and swirl components.
Figure 9B:
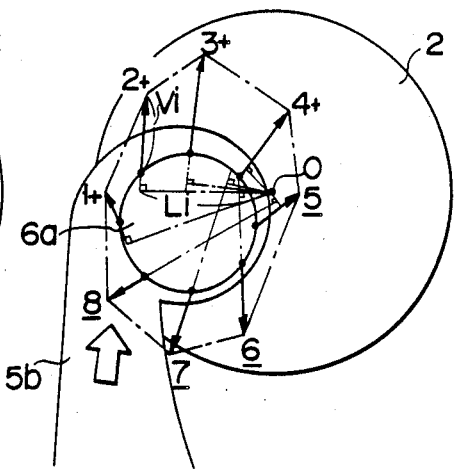
Figure 10A:
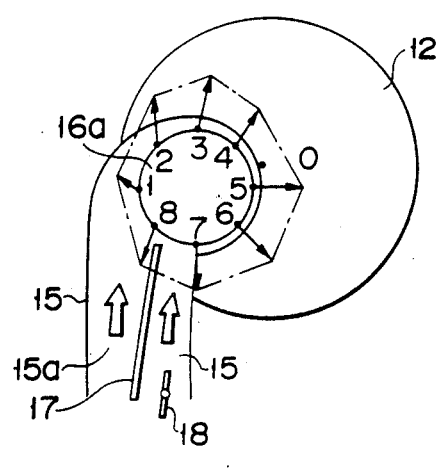
FIGS. 10A and 10B are views for explaining different swirl states and swirl components in different prior arts.
Figure 10B:
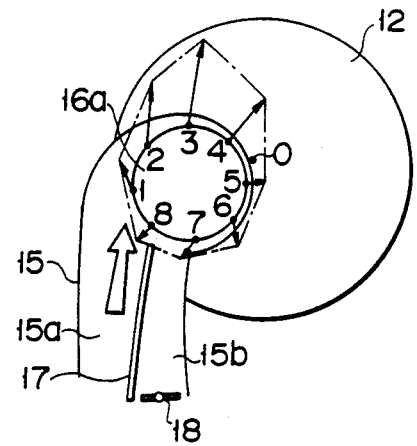
Figure 11A:
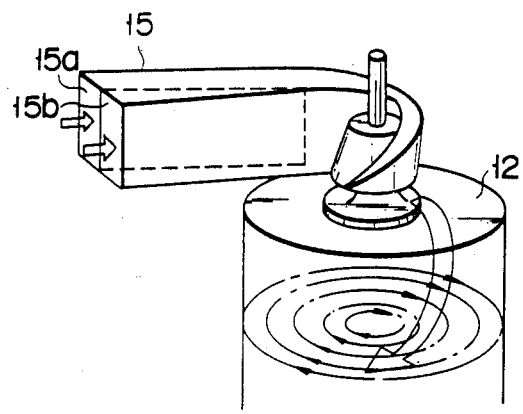
FIG. 11A is a schematic perspective view of the prior art shown in FIG. 10A.
Figure 11B:
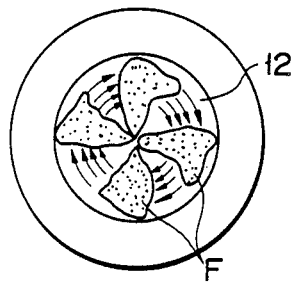
FIG. 11B is a view of explaining a spray state.
Figure 11C:
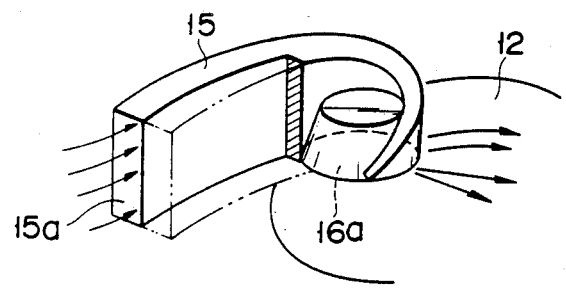
FIG. 11C is a view for explaining an intake state.
Figure 12:
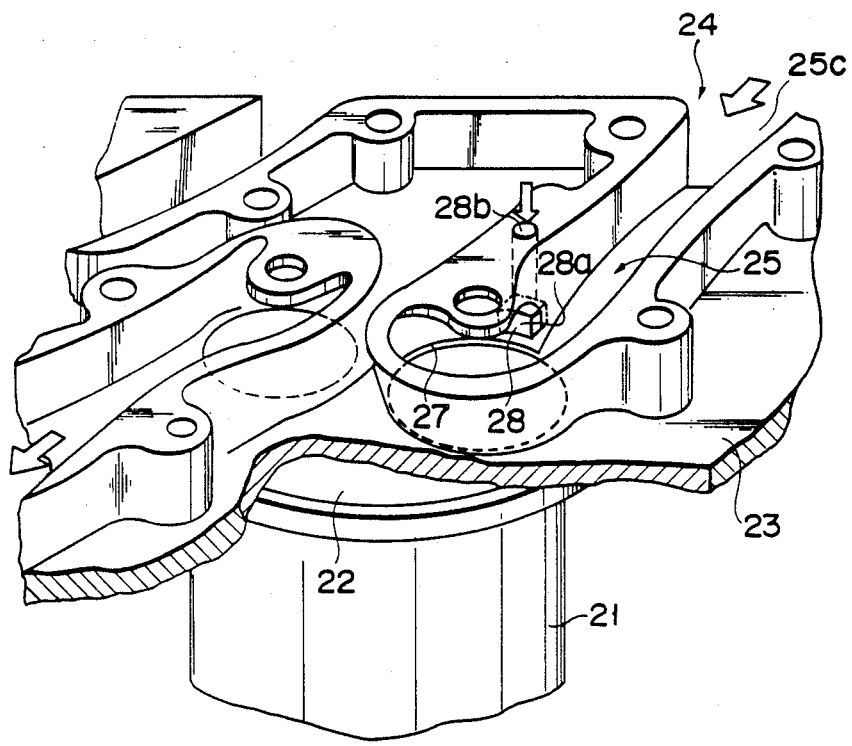
FIG. 12 is a perspective view showing the main part of an engine according to a first embodiment of the present invention.

An embodiment of the present invention will now be described with reference to the accompanying drawings.

In a first embodiment shown in FIGS. 12 and 13A to 13C, reference numeral 21 denotes a cylinder liner; 22, a cylinder chamber; 23, a cylinder head; and 24, an intake apparatus. Intake apparatus 24 is mounted on cylinder head 23. Reference numeral 25 denotes an intake port of intake apparatus 24; 26, an intake valve; 27, an intake valve seat; and 28, a swirl control path.

Figure 19:
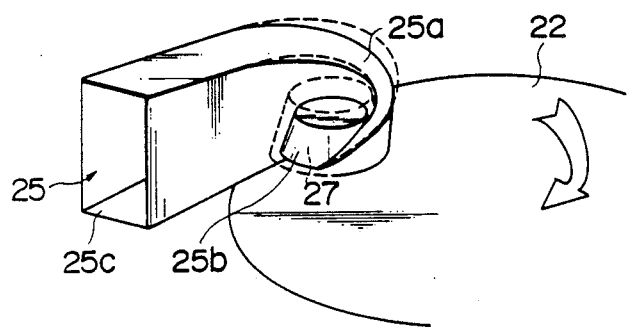
FIG. 19 is a perspective view of the intake port.

Intake port 25 is constituted by entrance portion 25c, the end portion of which is open to the side surface of cylinder head 23, substantially cylindrical swirl chamber 25b connected to the distal end portion of entrance portion 25c, and swirl chamber 25a which extends from entrance portion 25c and communicates with swirl chamber 25b so as to be looped around the outside of swirl chamber 25b, as shown in FIG. 19.

Figure 13A:
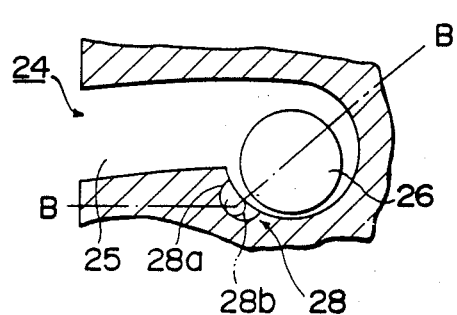
FIG. 13A is a cross-sectional view of an intake apparatus.
Figure 13B:
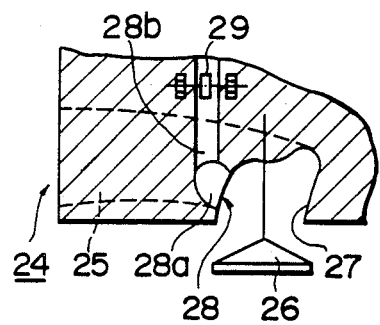
FIG. 13B is a longitudinal sectional view taken along line B—B in FIG. 13A.
Figure 13C:
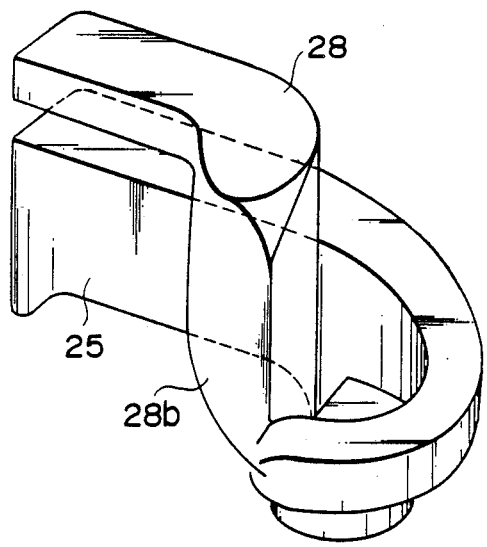
FIG. 13C is a perspective view of a core.

Intake port 25 is slightly eccentric from the center of intake valve 26. Therefore, intake port 25 has an optimal structure to obtain a high swirl ratio when external air receiving an eccentricity due to intake port 25 enters cylinder chamber 22 through intake valve seat 27 during an intake stroke or the like. Intake valve 26 is driven to open/close intake valve seat 27 at a given timing. Swirl control path 28 is constituted by opening portion 28a which is open to the peripheral wall of the proximal end portion of intake port 25, corresponding to a position immediately before intake air having a low flow rate entering intake port 25 is about to enter cylinder chamber 22, and control path 28b for introducing external air into opening portion 28a. For example, butterfly valve 29 is arranged at the entrace of control path 28b, and is opened/closed in response to a signal from a controller comprising a microcomputer. FIG. 13C shows a core for forming intake apparatus 24. As can be seen from FIG. 13C, control path 28b is more preferably arranged to extend substantially vertically at a position immediately before opening portion 28a.

During an intake stroke wherein intake valve 26 is moved downward and intake port 25 is opened, intake air enters cylinder chamber 22 through intake valve seat 27, and a swirl is forcibly formed along its circumferential direction. This air flow is mixed with fuel injected from an injection nozzle (not shown), and the mixture is then combusted.

Butterfly valve 29 is closed when the swirl ratio of intake air entering cylinder chamber 22 is to be increased, and is opened when the swirl ratio is to be decreased. The high swirl state can be explained with reference to FIGS. 14A and 14B, and the low swirl state can be explained with reference to FIGS. 15A and 15B.

Figure 14A:
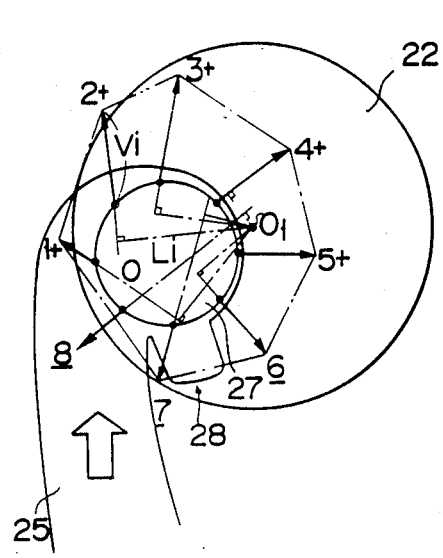
FIG. 14A is a view for explaining swirl components in a high swirl state.
Figure 15A:
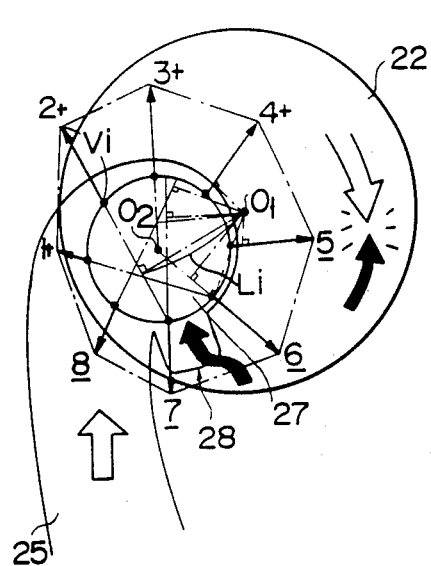
FIG. 15A is a view for explaining swirl components in a low swirl state.

In FIGS. 14A and 15A, intake valve seat 27 is divided into eight sections, and these sections are denoted by numbers 1 to 8. At the respective number positions, intake air components, having directions indicated by corresponding arrows and strengths corresponding to the lengths of the arrows, enter cylinder chamber 22. In cylinder chamber 22, the intake direction of swirl components Nos. 1 to 4 in intake port 25 also corresponds to a clockwise direction (+) around center 01 of cylinder chamber 22, and they are forward swirl components. Thus, moments of these components are forward swirl moments. Swirl components Nos. 5 to 8 tend to turn counterclockwise (−) around center 01, and are reverse swirl components. The moments of these components are reverse swirl moments. More specifically, in FIG. 14A, swirl control path 28 is open to a portion below line A connecting centers 01 and 02 (on the side of entrance portion 25c of intake port 25), so that a satisfactory reverse swirl is produced, and hence, the low swirl state can be effectively obtained.

Figure 14B:
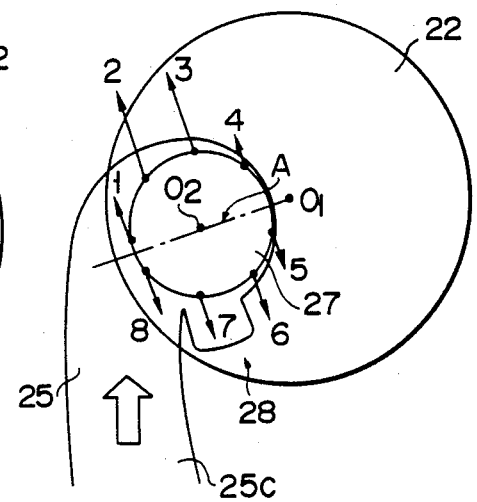
FIG. 14B is a view for explaining swirl moments in the high swirl state.
Figure 15B:
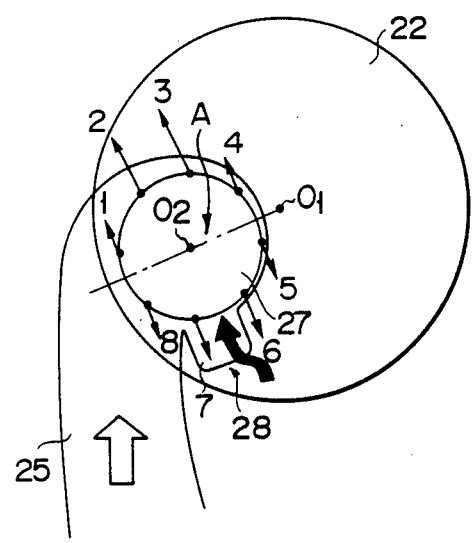
FIG. 15B is a view for explaining swirl moments in the low swirl state.

In FIGS. 14B and 15B, magnitudes of swirl component moments of the respective numbers are indicated by arrows of forward and reverse directions. Note that 02 represents the center of intake valve seat 27. In FIGS. 14A and 14B, since swirl control path 28 is closed, a difference between the total of the forward swirl moments and that of the reverse swirl moments is sufficiently large, and hence, the high swirl state can be presented as a whole. In FIGS. 15A and 15B, since swirl control path 28 is open, intake air also enters therefrom, and reverse swirl moments near components Nos. 6 and 7 become large. The total of moments in this direction approximates the total of the forward swirl moments.

Intake air in the forward swirl direction in cylinder chamber 22 collides with intake air in the reverse swirl direction entering from swirl control path 28, and they cancel each other to obtain the low swirl state. In this case, an intake flow rate corresponding to that entering from swirl control path 28 in addition to that entering from intake port 25 can be maintained. Since control path 28b extends substantially vertically, intake air can smoothly enter cylinder chamber 22. Therefore, the low swirl state with a sufficient intake amount can be establishied. In particular, when an engine speed is in a high speed range, the low swirl state is preferable, as has been described above. When swirl control path 28 is opened, the preferable state can be obtained while maintaining a sufficient intake amount.

Figure 16A:
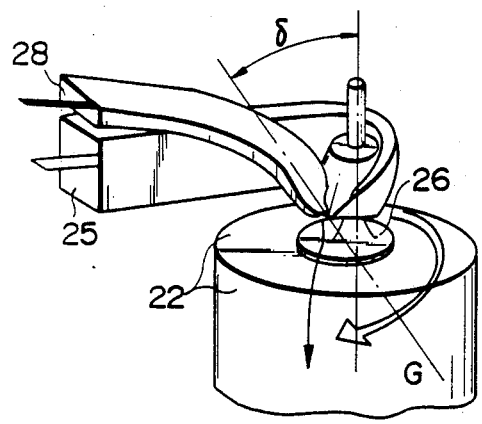
FIG. 16A is a perspective view for explaining the low swirl state.
Figure 16B:
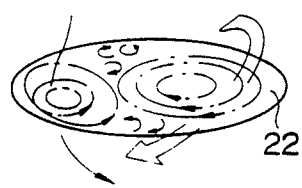
FIG. 16B is a perspective view for explaining the high swirl state.
Figure 16C:
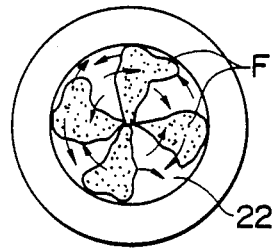
FIG. 16C is a view for explaining a spray state in the low swirl state.
Figure 17:
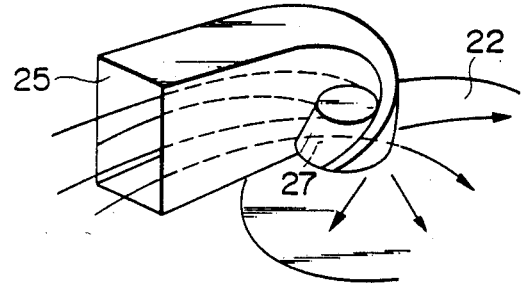
FIG. 17 is a perspective view for explaining an intake state.

As shown in FIGS. 16A and 16B, a forward high swirl (indicated by a white arrow) from intake port 25 and a reverse swirl (indicated by a black arrow) from swirl control path 28 interfere with each other in cylinder chamber 22, so that two swirls having different rotating directions are produced, and a large number of small swirls or turbulent flows are formed. Some of the large number of small swirls and turbulent flows remain after a compression stroke, and fasciliate mixture of sprays F and air, as shown in FIG. 16C, resulting in an improved combustion efficiency and elimination of smoke and exhaust gas. In the high swirl state, as shown in FIG. 17, intake air is smoothly guided along the streamlined dimension of intake port 25 at a minimum rate without any loss. Since air enters cylinder chamber 22 from the entire periphery of intake valve seat 27, a swirl is high and an intake amount is very large.

Figure 18:
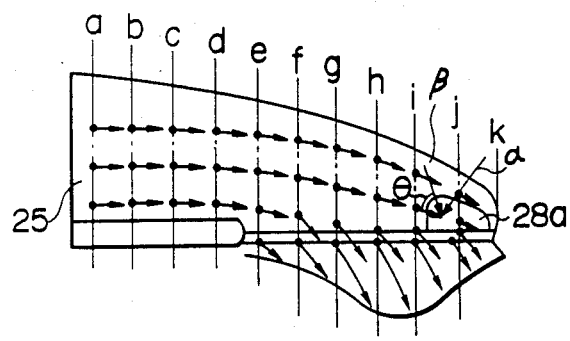
FIG. 18 is an exploded view of an intake port.

In the high swirl state, opening portion 28a of swirl control path 28 will not adversely influence intake air flow in intake port 25. This can be explained with reference to FIG. 18. More specifically, FIG. 18 is an exploded view of intake port 25, and respective arrows indicate directions and strengths of intake air at the corresponding positions of intake port 25. Reference symbol a indicates an entrance side of intake port 25, and respective symbols approach intake valve seat 27 in the order named. Reference symbol k corresponds to a proximal end portion of intake port 25, and opening portion 28a is formed on the peripheral wall thereof. On entrance positions a and b, the directions of intake air components are parallel to each other and the strengths thereof are substantially the same. However, since intake air components flow along the swirl shape of intake port 25 near positions d and e, the flow rate of intake air is increased. However, a main flow has already entered cylinder chamber 22 near proximal end positions i, j, and k, and only a flow of a low flow rate remains. Since opening portion 28a does not have a projecting shape but a recessed shape, this will not become a resistance against the intake air flow. For these reasons, when swirl control path 28 is disabled in the high swirl state, the swirl performance will not be adversely influenced. In a low engine speed range in which energy mixture of air and fuel is normally insufficient, a good engine performance, such as improved combustion efficiency, can be obtained irrespective of a spray state.

Since intake port 25 is of a high swirl type, the ceiling height of swirl chamber 25a corresponding to the port end portion can be decreased more than that of a low swirl type indicated by a broken line, as shown in FIG. 19, and an inclination angle can also be reduced. A projecting length of port loop end portion 25b can be reduced, resulting in easy molding.

Figure 20:
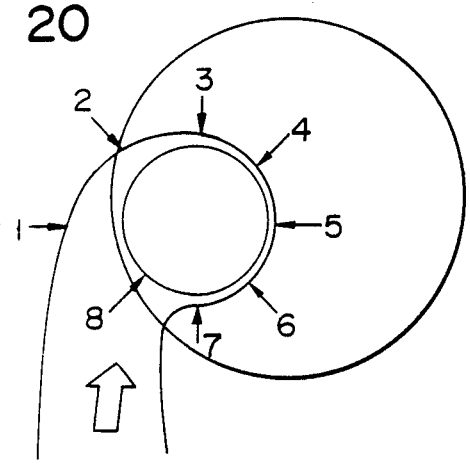
FIG. 20 is a plan view for selecting opening positions.
Figure 21:
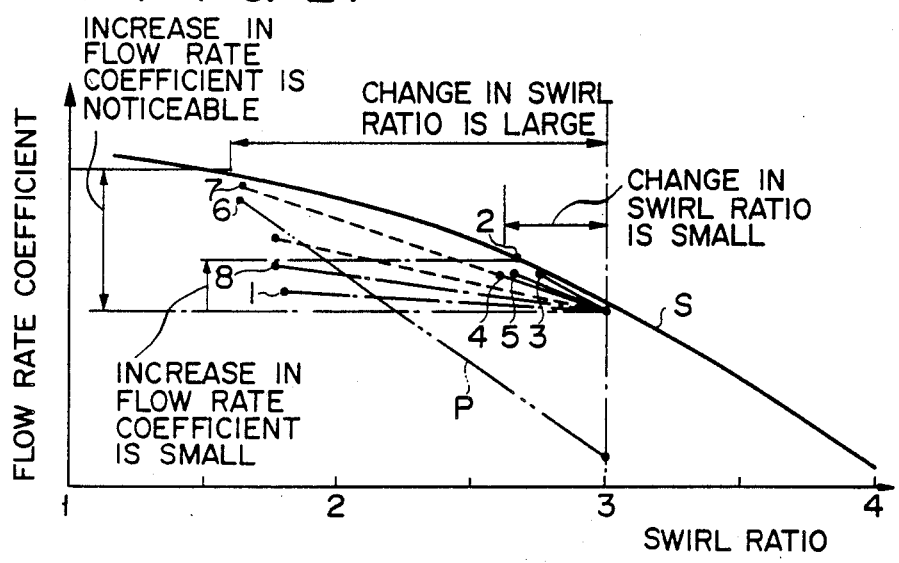
FIG. 21 is a view showing the relationship between a swirl ratio and a flow rate coefficient in the respective openings.

Since the position of opening portion 28a of swirl control path 28 provides a delicate influence to the swirl performance in cylinder chamber 22, the optimal position must be selected. As shown in FIG. 20, points Nos. 1 to 8 are determined, and opening portion 28 is provided at each position so as to observe swirl characteristics. FIG. 21 shows the results obtained. Changes indicated by numbers represent the relationships between swirl rations and flow rate coefficients when opening portion 28a is arranged at the corresponding positions. Note that swirl ratio 3 corresponds to an idling state, and a high-speed, high-load operation is performed as the swirl ratio is decreased therefrom. Change S indicated by the solid curve represents the relationship for obtaining an ideal intake port performance. It is difficult to realize this performance by an actual structure, but efforts have been made to approach this performance. As can be seen from FIG. 21, changes in swirl ratios are increased on the order of numbers 7, 6, 8, and 1, and changes in swirl ratios of numbers 2 to 5 are small. Increases in flow rate coefficients of numbers 6 and 7 are noticeable, and increases of numbers 1 to 5 and 8 are small. Note that change P indicated by the alternate long and two short dashed curve in FIG. 21 corresponds to that of a conventional structure described in Japanese Patent Publication No. 51-7243.

Figure 22A:
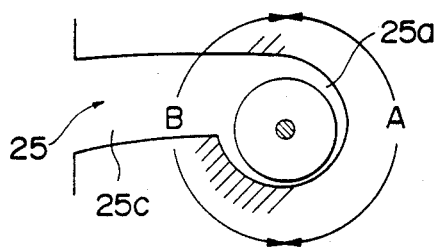
FIG. 22A is a plan view of the intake apparatus for explaining the data shown in FIG. 21.
Figure 22B:
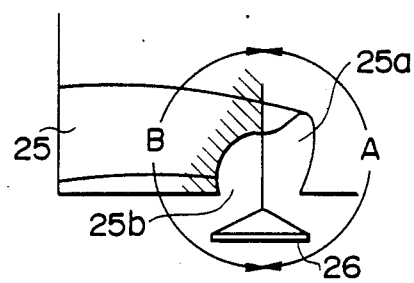
FIG. 22B is a sectional view of FIG. 22A.
Figure 23A:
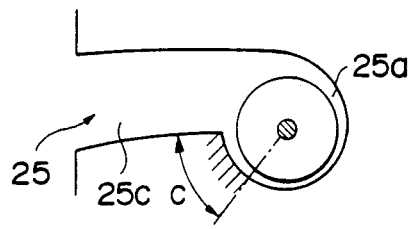
FIG. 23A is a plan view of the intake apparatus for explaining the data shown in FIG. 21.
Figure 23B:
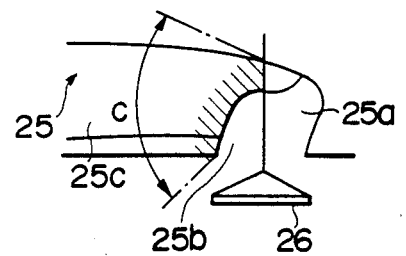
FIG. 23B is a sectional view of FIG. 23A.
Figure 24:
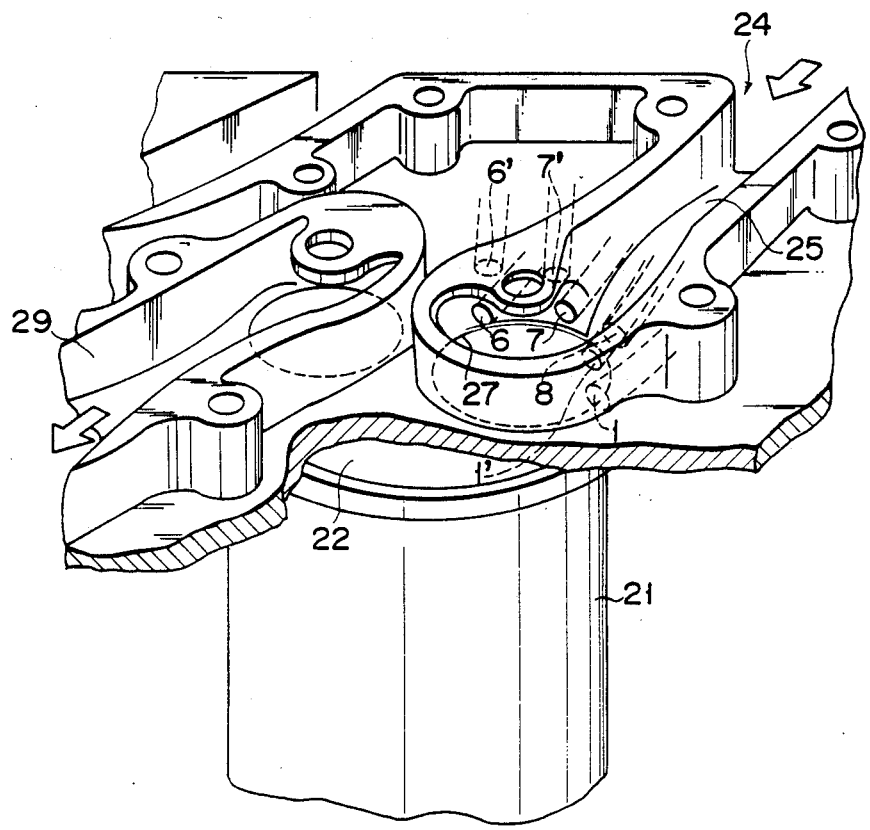
FIG. 24 is a perspective view of the main part of an engine.

It was found from the results shown in FIG. 21 that portions of the peripheral wall of swirl chamber 25a which can most greatly change a swirl correspond to hatched regions B in FIGS. 22A and 22B. Meanwhile, portions at which a flow rate coefficient is most increased and a good variable swirl characteristic can be obtained in the low swirl state (high-speed, high load state) correspond to hatched regions C in FIGS. 23A and 23B. Therefore, from the relationship between the swirl ratio and the flow rate coefficient, positions of numbers 6 and 7 are most effective. In this case, the opening direction must be selected so that an air flow can meet a main air flow guided from intake port 25 at a steep angle (arrow β) or at least a right angle (arrow α), as shown in FIG. 18. FIG. 24 illustrates opening portion positions of numbers 6, 7, 8, and 1. In FIG. 24, 6', 7', 8', and 1' are portions immediately above numbers 6, 7, 8, and 1, respectively, and as will be understood from the following conclusion, the same effect can be obtained even if the position of the opening portion is vertically shifted.

Figure 46:
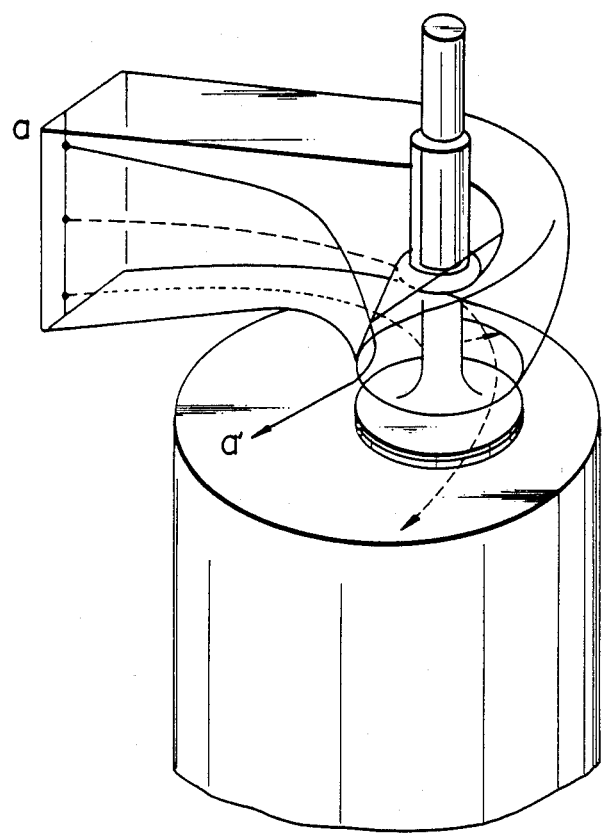
FIG. 46 is a perspective view showing a normal swirl port.

The present inventors have made extensive studies which demonstrated that an air flow causing a reverse swirl enters cylinder chamber 22 from regions 5 to 8 of FIG. 14 of the first embodiment. As shown in FIG. 46, the results of experiments conducted by the present inventors reveal that an air flow along curve a—a' in a swirl port can enter a cylinder chamber from regions 5 to 8 in FIG. 14. More specifically, the air flow along curve a—a' enters the swirl port from the upper portion of the entrance, and immediately flows downward near an intake valve.

Therefore, as shown in FIG. 16A, it is preferable that swirl control path 28 in the first embodiment is arranged on regions 5 to 8 in FIGS. 14A and 14B so as to form small inclination angle δ with the axis of the intake valve. From other experimental results, it was found that inclination angle δ preferably falls within the range of $0° \leq \delta \leq 70°$. If the inclination angle is smaller than 0°, intake valve 26, the fuel injection nozzle, and the like interfere with the arrangement of swirl control path 28. If the inclination angle exceeds 70°, vertical components are eliminated, and a flow amount from regions 5 to 8 is decreased. In addition, horizontal components interfering with an intake flow from intake port 25 are increased, and an amount of air entering cylinder chamber 22 is decreased.

In the first embodiment, the direct injection type diesel engine has been described. However, the present invention is not limited to this, and can be applied to a gasoline engine.

In the first embodiment, butterfly valve 29 is fully opened or closed. However, the present invention is not limited to this. If butterfly valve 29 is half-opened, a middle swirl state can be obtained, as a matter of course. Thus, a swirl state corresponding to an opening degree can be obtained. Therefore, valve 29 need not always be a butterfly valve, but can be a valve capable of opening degree adjustment.

Control path 28b communicates with opening portion 28a to serve as swirl control path 28. However, the present invention is not limited to this, but a simple hole for introducing external air can be adopted. Control path 28b extends vertically but can extend horizontally. In addition, control path 28b can branch from intake port 25. In this case, an opening/closing valve must be arranged midway therealong.

Figure 25:
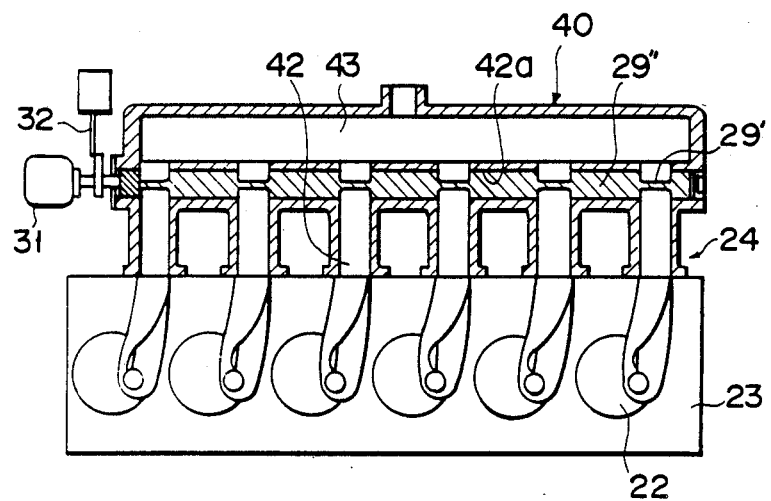
FIG. 25 is a cross-sectional view showing the main part of an engine according to a second embodiment of the present invention.
Figure 26:
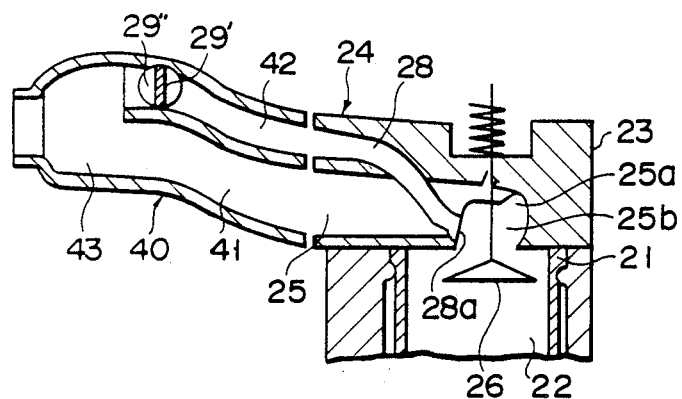
FIG. 26 is a longitudinal sectional view of the main part of the engine.

A second embodiment of the present invention will now be described with reference to FIGS. 25 to 30. The same reference numerals in this embodiment denote the same parts as in the first embodiment, and a detailed description thereof will be omitted. As shown in FIGS. 25 and 26, intake apparatus 24 is mounted on cylinder head 23 and intake manifold 40. Intake port 25 communicating with corresponding cylinder chamber 22, intake valve seat 26, intake valve 27, and swirl control path 28 having opening portion 28a on its peripheral wall near corresponding intake valve 27 are formed in cylinder head 23. Intake manifold 40 is constituted by main branch pipes 41 communicating with corresponding intake ports 25, sub branch pipes 42 communicating with corresponding swirl control paths 28, merge portion 43 communicating with branch pipes 41 and 42 and an air cleaner (not shown), and shaft valves 29' provided to corresponding sub branch pipes 42. Note that each swirl control path 28 is open to the peripheral wall of a loop end portion of corresponding swirl chamber 25a arranged in the distal end portion of intake port 25.

Figure 27:
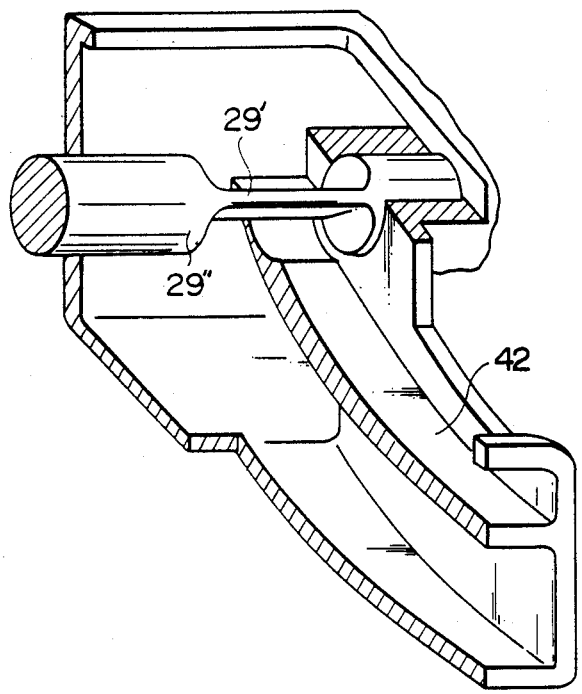
FIG. 27 is a partially cutaway perspective view of the intake apparatus.
Figure 28:
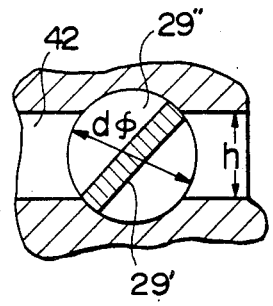
FIG. 28 is a longitudinal sectional view of a swirl control path and a shaft valve.
Figure 29:
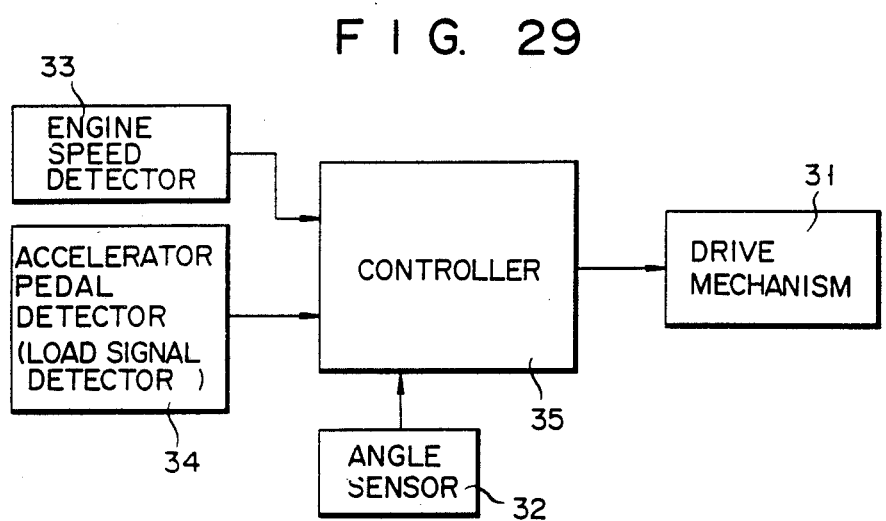
FIG. 29 is an electrical block diagram.

Shaft valve 29' is rotatably arranged on the other opening portion of swirl control path 28. More specifically, as shown in FIGS. 27 and 29, two side surfaces of the middle portion of shaft 29" as a single round rod are cut to form shaft valve 29', so that only a thin portion along the axis is left. Vertical dimension h of sub branch pipe 42 is slightly smaller than diameter $d\phi$ of shaft valve 29'. Thus, when shaft valve 29' is oriented in the vertical direction, sub branch pipe 42 can be fully closed, and a flow rate is controlled by pivoting valve 29' in any direction. Therefore, when shaft valve 29' is oriented in the horizontal direction, pipe 42 is fully opened. Shaft 29" an be inserted in mounting hole 42a which extends along the longitudinal direction of intake manifold 40 and perpendicular to sub branch pipe 42 from the right end portion of FIG. 25, so that thin portion 30a faces swirl control path 29, resulting in very easy mounting. Only the left end portion of shaft 29" extends from intake manifold 40 and is mechanically coupled to drive mechanism 31 as a drive motor. Note that reference numeral 32 denotes an angle sensor for detecting a pivotal angle of shaft 29".

Drive mechanism 31 is electrically connected to controller 35 comprising a microcomputer and the like, which receives detection signals from detector 33 for detecting engine speed and detector 34 for detecting a depression angle of an accelerator pedal or for directly detecting a load state.

During the intake stroke wherein intake valve 27 is moved downward and intake valve seat 26 is opened, intake air receiving eccentricity due to intake port 25 enters cylinder chamber 22, and a swirl is forcibly formed along its circumferential direction. The air is mixed with fuel injected from an injection nozzle (not shown), and is then combusted.

Controller 35 receives detection signals from detectors 33 and 34 for respectively detecting an engine speed and a depression angle of the accelerator pedal (load), and sends a pivot signal to drive mechanism 31. Controller 35 continuously operates drive mechansim 31 until a predetermined pivotal angle is obtained, while a pivotal angle of shaft 29" pivoted by drive mechanism 31 is detected by angle sensor 32. Note that the control apparatus comprises shaft valves 29', shafts 29", drive mechanism 31, angle sensor 32, detectors 33 and 34, and controller 35.

Figure 30:
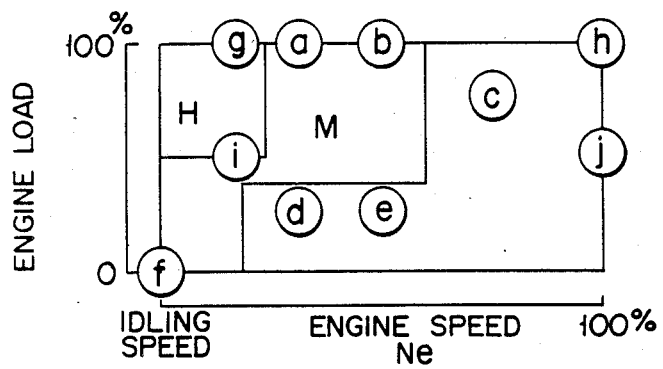
FIG. 30 is a view showing a swirl ratio map of the second embodiment.
Figure 31:
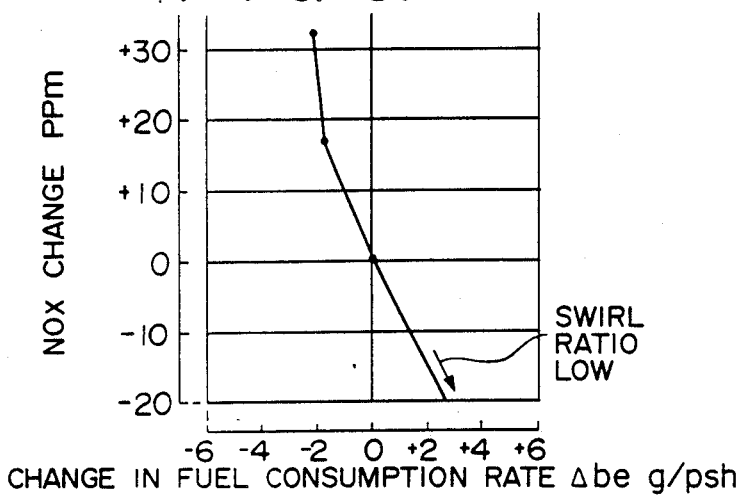
Figure 32:
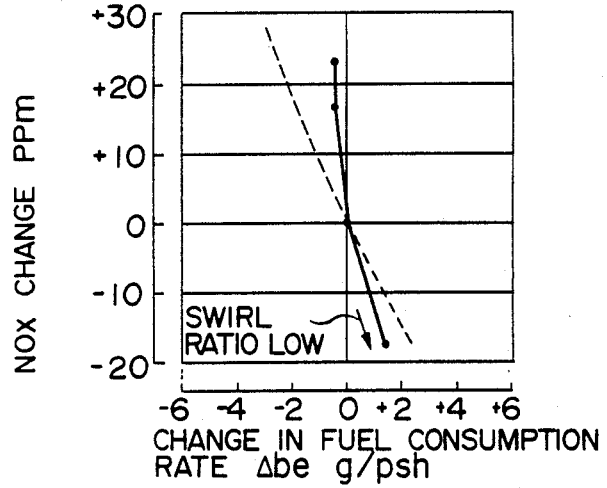
Figure 36:
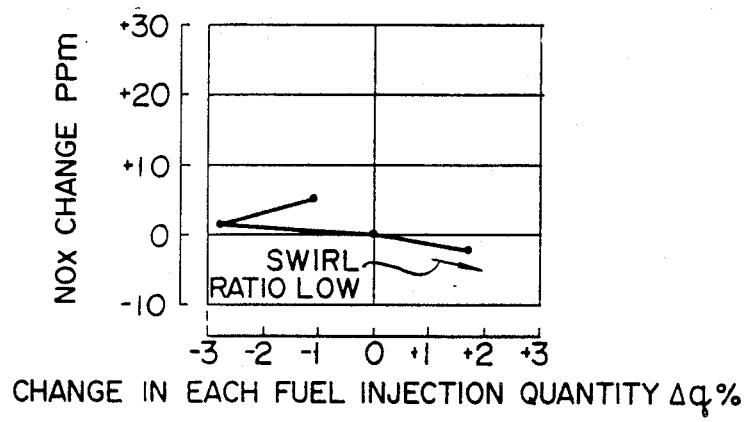

An engine is started, and detectors 33 and 34 respectively detect region L in FIG. 30 (middle-speed, low-load/overall high-speed range) in accordance with an engine speed and a depression angle of the accelerator pedal. Controller 35 drives drive mechanism 31 to rotate shaft 29", thereby fully opening shaft valve 29'. A large amount of air then enters corresponding swirl control path 28 from sub branch pipe 42, and is mixed with main air flow flowing from intake port 25 in swirl chamber 25a. Then, the mixed air flow enters cylinder chamber 22. At this time, air flowing from swirl control path 28 accelerates speed components 5 to 8, as shown in FIG. 14A, so that a reverse swirl is increased, and a forward swirl is decreased to have a swirl ratio of 2.5. At this time, air also flows from swirl control path 28.

When detectors 33 and 34 detect region M in FIG. 30 (low speed, low load/middle speed, middle-high load) in accordance with the engine speed and the depression angle of the accelerator pedal, controller 35 enables drive mechanism 31 so as to rotate shaft 29", thereby half-opening shaft valve 29'. Thus, since an amount of air flowing from swirl control path 28 is decreased, the reverse swirl in cylinder chamber 22 is weakened, and the swirl ratio in cylinder chamber 22 becomes 3.0, thereby forming a swirl of middle strength.

When controller 35 detects region H in FIG. 30 (low speed, middle-high load), it closes shaft valve 29'. No air flows from swirl control path 28, and a strong swirl is formed in cylinder chamber 22.

Figure 37:
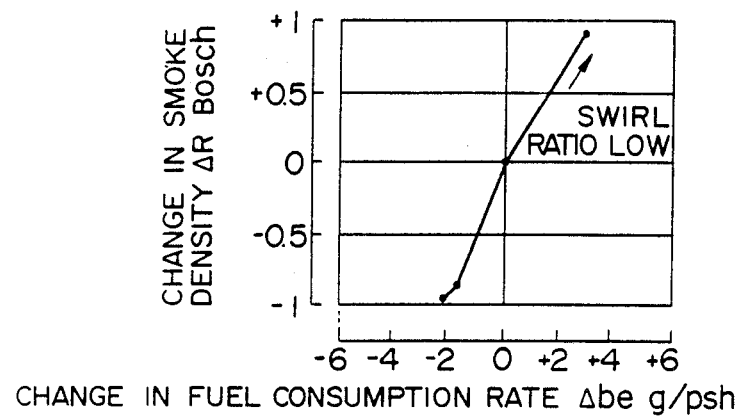
FIGS. 37 and 38 are views showing the relationship between a change in exhaust concentration and a change in fuel consumption rate when the swirl ratios at points a and b in FIG. 30 are changed, respectively.
Figure 38:
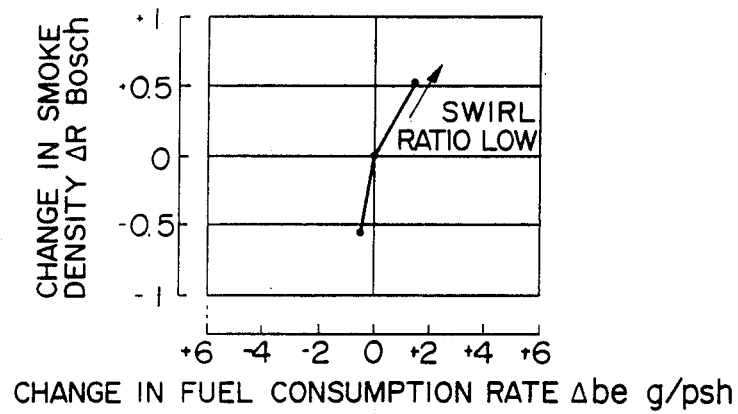
Figure 39:
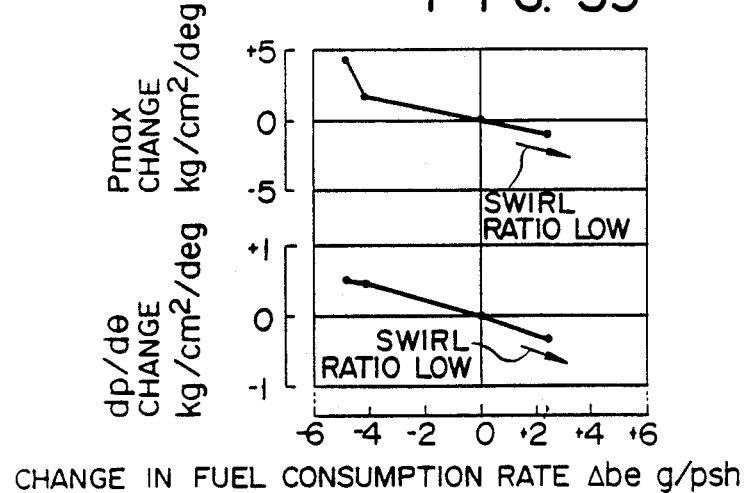
FIGS. 39 and 40 are views showing the relationship between a change in fuel consumption rate, and a dp/de change and a Pmax change when the swirl ratios at points q and h in FIG. 30 are changed, respectively.
Figure 40:
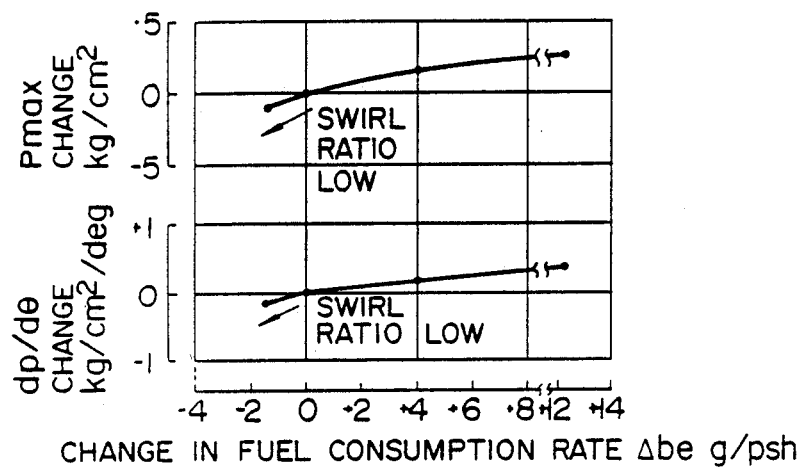
Figure 41:
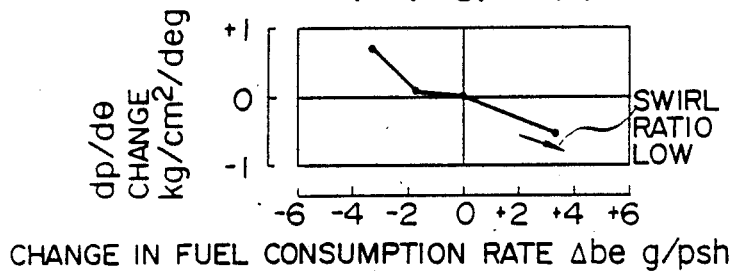
FIGS. 41 and 42 are views showing the relationship between a change in fuel consumption rate and a $dp/d\theta$ change when the swirl ratios at points i and j in FIG. 30 are changed.
Figure 42:
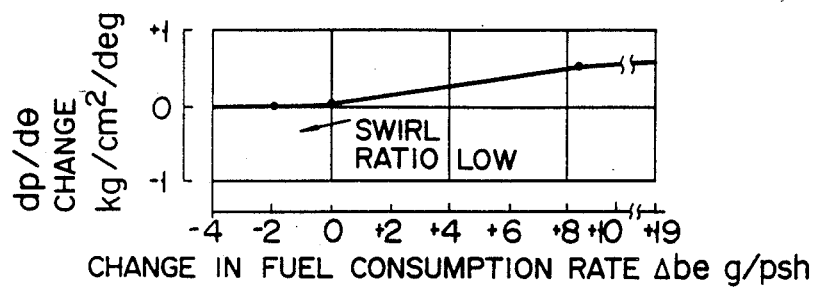

FIGS. 31 to 36 are graphs showing change $\Delta be$ in fuel consumption rate and an $NO_x$ change when a swirl is changed at points a to f in FIG. 30, and FIGS. 37 and 38 are graphs showing a change in fuel consumption rate and a change in smoke concentration when a swirl is changed at points a and b. FIGS. 39 and 40 are graphs showing $dp/d\theta$ (a change in cam angle of an injection pump and fuel chamber pressure) at points g to j in FIG. 30.

As can be seen from these graphs, when a swirl ratio is increased, a fuel consumption rate is considerably reduced, almost no exhaust gas is exhausted, and a fuel pressure is also small although $NO_x$ and $dp/d\theta$ are slightly impaired (if $dp/d\theta$ increases, a fuel quantity increases). Therefore, a high swirl ratio is preferable.

When a swirl ratio is decreased at points c, d, e, h, and j, a change in fuel consumption rate is small and $dp/d\theta$ and $NO_x$ are also small. Therefore, a low swirl ratio is preferable.

When a swirl ratio is increased at points a, b, and f, $NO_x$ is immediately impaired although a fuel consumption quantitiy is slightly improved. When the swirl ratio is decreased at these points, a smoke concentration is immediately impaired. Therefore, a middle swirl ratio is preferable at these points.

When the swirl ratio is changed in three regions H, M, and L in FIG. 30, $NO_x$, smoke concentration, and $dp/d\theta$ can be reduced while improving a fuel consumption rate.

When the swirl ratio shown in FIG. 30 enters region L, controller 35 drives an electronic timer (not shown) to advance a fuel injection timing, thereby reducing a fuel consumption rate. When the engine speed ratio reaches 85%, the fuel-injection timing is further advanced, thereby improving fuel consumption rate in the low swirl state.

Figure 43:
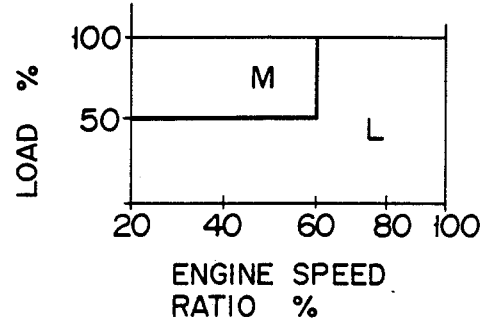
FIG. 43 is a view showing a swirl ratio map according to a third embodiment of the present invention.
Figure 44:
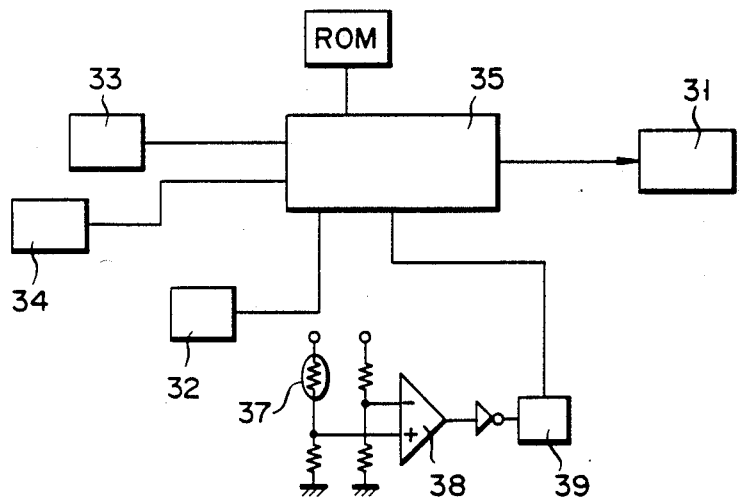
FIG. 44 is a circuit diagram of the third embodiment.
Figure 45:
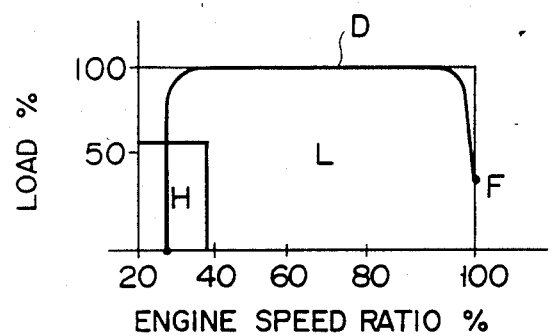
FIG. 45 is a view showing a swirl ratio map according to a fourth embodiment.

In a third embodiment shown in FIGS. 43 and 44, when an engine is at low temperature, a swirl is preferably weakened from a normal one in order to eliminate a cold loss, to improve an engine starting property, and to prevent white smoke. In the swirl ratio map when the engine is at low temperature, a middle value in a low-middle speed, middle-high load region (e.g., 3.0) is set, and a low value (e.g., 2.0) in other region is used, as shown in FIG. 45. The maps shown in FIGS. 30 and 45 are selected in accordance with a temperature signal from thermistor 37 arranged in a case housing controller 35. More specifically, when ambient temperature of the case is decreased below a predetermined value, the resistance of thermistor 37 exceeds a predetermined value, and one-shot multivibrator 39 is turned on in response to a signal from comparator 38. Controller 35 determines from the ON signal from one-shot multivibrator 39 that the engine is at low temperature, and selects the map shown in FIG. 43 stored in a ROM. Thus, controller 35 drives drive mechanism 31 in accordance with the engine speed and the depression angle of the accelerator pedal from detectors 33 and 34, so as to obtain the swirl ratio of the selected map, thereby controlling an opening angle of shaft valve 29'.

After a predetermined period of time (e.g., 5 minutes) has passed, one-shot multivibrator 39 is turned off. When controller 35 detects the OFF signal of one-shot multivibrator 39, it selects the map shown in FIG. 30, and reads out the swirl ratio of the map with reference to the engine speed and the depression angle of the accelerator pedal. Thus, controller 35 drives the drive mechanism to obtain the swirl ratio.

The low temperature state of the engine is detected by thermistor 39 arranged in the case of controller 35 in order to facilitate the circuit arrangement. However, this can be detected from a cooling water temperature.

In the second embodiment, when the accelerator pedal is quickly depressed deeply in a no-load state, the engine load is immediately increased, as indicated by line D in FIG. 45, and the engine speed is also immediately increased. The engine speed reaches point F, a so-called high idle, upon operation of a governor. At this time, if the swirl ratio map shown in FIG. 30 is used, changes in engine load and engine speed cannot be followed due to a delayed operation of drive mechanism 31, and a high swirl ratio state is set in the high engine speed range, thus generating $NO_x$. In order to prevent this, a swirl ratio map shown in FIG. 45 is used in a fourth embodiment. Other arrangements of the fourth embodiment are the same as those in the third embodiment. More specifically, if a change in engine speed exceeds a given value three times, controller 35 selects the swirl ratio map shown in FIG. 45. Thus, the high swirl ratio is obtained in the low-speed, middle-low load range of the engine and the low swirl ratio is obtained in other ranges. When the accelerator pedal is quickly depressed, the engine is operated according to line D. When the engine has reached the low-speed, middle-load range, controller 35 operates drive mechanism 31 to switch from the high swirl ratio to the low swirl ratio. However, shaft valve 29' maintains the high swirl ratio due to delayed response of drive mechanism 31 until the middle-speed, high-load range is reached. When the middle-speed, high-load range is reached, shaft valve 29' is gradually opened, thereby maintaining the middle swirl ratio until the high-speed, high-load state is obtained. Thus, when the high-speed, high-load state is reached, the low swirl ratio is set. In this manner, $NO_x$ can be satisfactorily reduced.

In the second embodiment, when a fuel having a low cetane value is used, the values of H, M, and L of the swirl ratio shown in FIG. 30 are respectively reduced, thereby preventing an abnormal increase in maximum combustion pressure and an increase in $dp/d\theta$.

In the second embodiment, shaft 29" is rotated by the motor, but can be pivoted by a pneumatic or hydraulic pressure of a magnetic force.

In the second embodiment, the ratio of sectional area H of sub branch pipe 42 in shaft valve 29' to sectional area I of sub branch pipe 42 at the connecting portion to swirl control path 28 is preferably $1 < H/I < 2$. If this ratio is equal to or smaller than 1, the amount of air flowing into swirl control path 28 is insufficient, and if it exceeds 2, an intake resistance in sub branch pipe 42 is large.

The ratio of sectional area J of sub branch pipe 42 of intake manifold 40 to sectional area K of main branch pipe 41 preferably falls within the range of $1/6 \leq J/K \leq \frac{1}{2}$. If this ratio is smaller than 1/6, a sufficient reverse swirl cannot be produced at high engine speed, and the low swirl ratio cannot be obtained. If this ratio exceeds $\frac{1}{2}$, the amount of intake air upon high swirl state is decreased, and sufficient power cannot be obtained.

The ratio of sectional area L of intake port 25 to sectional area M of swirl control path 28 preferably falls within the range of $0.15 \leq M/L \leq 0.35$. If this ratio is smaller than 0.15, sectional area M is too small, and a difference between high and low swirl states is decreased. If this ratio exceeds 0.35, a flow rate coefficient in the case of high swirl ratio is decreased.

In the second embodiment, sub branch pipes 42 and main branch pipes 41 branch from merge portion 43 in intake manifold 40. However, sub branch pipes 42 and main branch pipes 41 can be directly connected to a duct which communicates with an air cleaner.

Figure 47A:
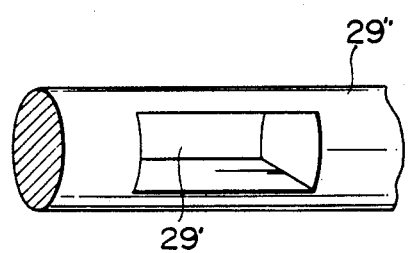
FIGS. 47A, 47B, and 48 are views showing modifications of the second embodiment.
Figure 47B:
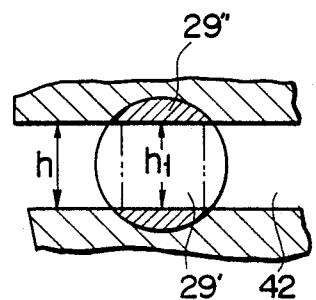
Figure 48:
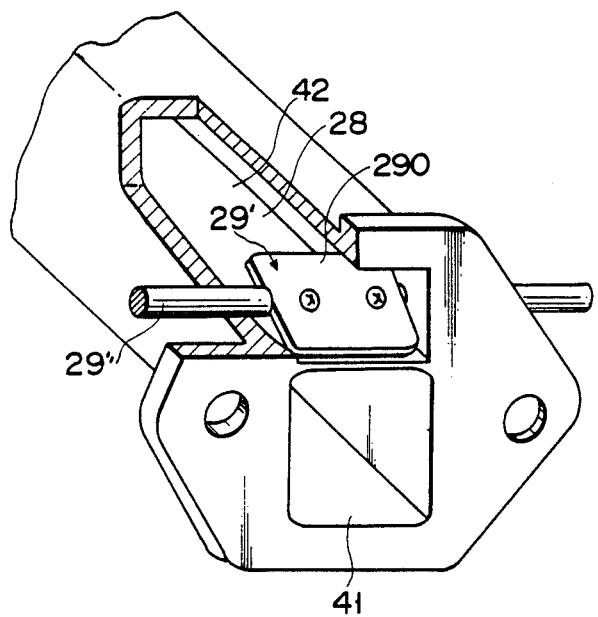

In the second embodiment, shaft valve 29' is formed by cutting both sides of the middle portion of shaft 29". However, shaft valve 29' can be obtained by forming an opening portion having height h1 in the middle portion of shaft 29", as shown in FIGS. 47A and 47B. Height h1 is substantially equal to or smaller than height h of sub branch pipe 42. As shown in FIG. 48, shaft 29" can be partially cut to be flattened, and thin plate 290 can be mounted on the flat portion by screws to obtain shaft valve 29'.

Figure 49:
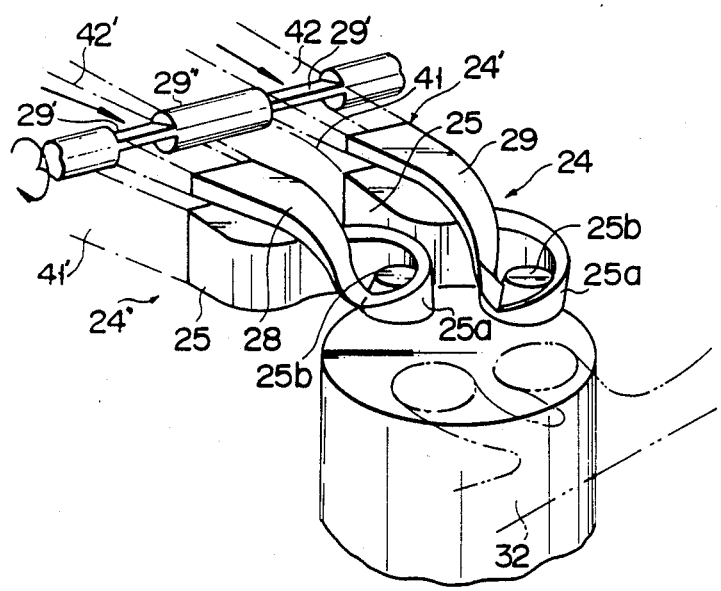
FIG. 49 is a perspective view showing a fifth embodiment.
Figure 50:
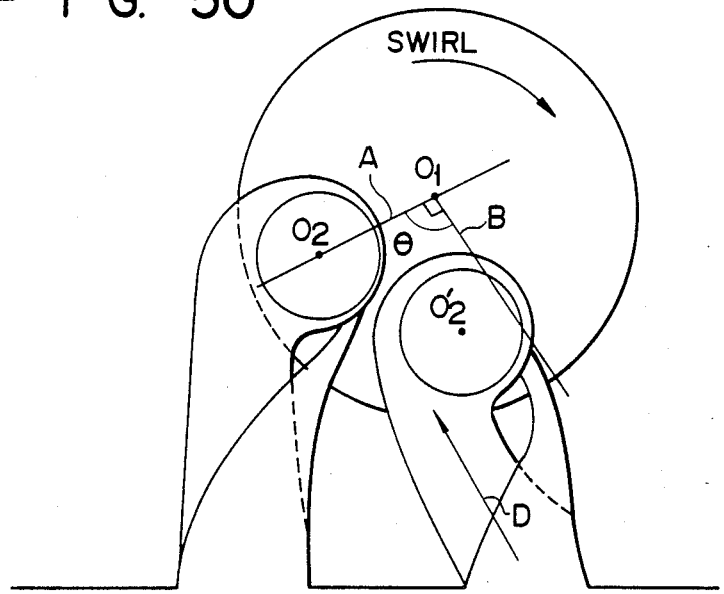
FIG. 50 is a plan view for explaining the fifth embodiment.
Figure 51A:
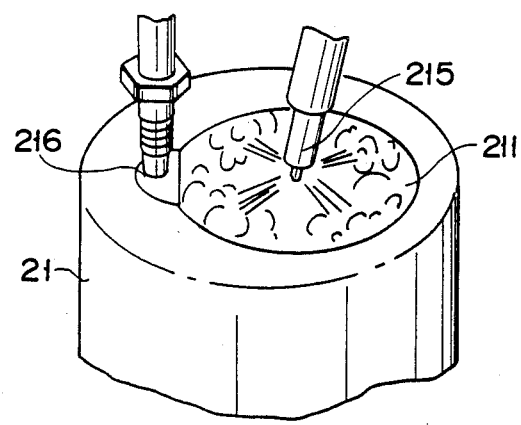
FIGS. 51A and 51B are perspective views showing a sixth embodiment.
Figure 51B:
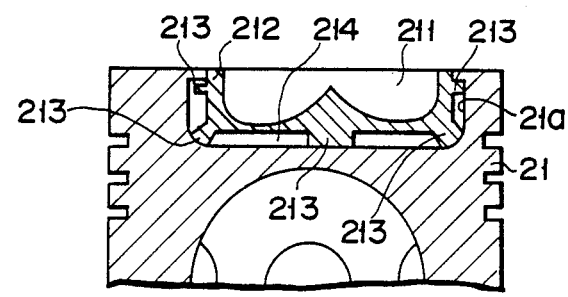
Figure 52A:
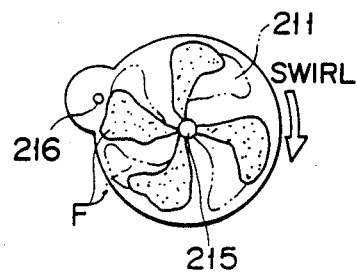
FIGS. 52A and 52B are views for explaining sprays in a combustion chamber of the sixth embodiment.
Figure 52B:
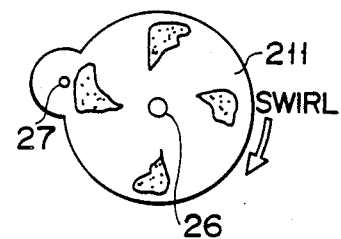

In the fifth embodiment shown in FIGS. 49 and 50, intake apparatus 24 in the second embodiment is applied to an engine having two intake valves 26. The same reference numerals in the fifth embodiment denote the same parts as in the second embodiment, and a detailed description thereof will be omitted.

In FIGS. 49 and 50, intake apparatus 24 comprises first intake mechanism 24' and second intake mechanism 24". First intake mechanism 24' has the same arrangement as the intake apparatus in the second embodiment, and has intake port 25, swirl chambers 25a and 25b, intake valve 26, swirl control path 28, sub branch pipe 42, main branch pipe 41, and shaft valve 29'. Second intake mechanism 24" also has the same arrangement as the intake apparatus in the second embodiment, and has intake port 25', swirl chambers 25'a and 25'b, intake valve 26', swirl control path 28', sub branch pipe 42', main branch pipe 41', and shaft valve 29'. Intake valve 26' of second intake mechanism 24" is closer to intake manifold 40 than intake valve 26' of first intake mechanism 24', as shown in FIG. 50. Center 02' of intake valve 26' is located inside angular range $\theta$ defined by line A connecting center 02 of intake valve 26 and center 01 at center 01 of cylinder chamber 22, and line B perpendicular to line A, and an opening portion of intake port 25' to cylinder head 23 is located on the downstream side of swirl chamber 25'b. Streamline D of intake port 25' is oriented in a forward direction with respect to the swirl of air flowing from intake valve 26.

In a sixth embodiment shown in FIGS. 51A, 51B, 52A, and 52B, spark plug is provided to the engine of the second embodiment. Reference numeral 21 denotes a piston. Adiabatic combustion chamber 211 is arranged on the head portion of piston 21. Adiabatic combustion chamber 211 is formed inside combustion chamber constituting member 212 which is formed of a material different from that of piston 21, e.g., heat-resistant steel, ceramic, or the like. A plurality of leg portions 213 project from the outer peripheral surface of combustion chamber constituting member 212. Thus, adiabatic air layer 214 is formed by leg portions 213 between the outer peripheral surface of member 212 and recess portion 21a formed on the head portion of piston 21. Combustion chamber constituting member 212 is fixed in recess portion 21a formed on the head portion of piston 21 by means of, e.g., insert.

Fuel injection nozzle 215 and spark plug 216 as an ignition member are disposed to face adiabatic combustion chamber 211. The distal end portions of fuel injection nozzle 215 and spark plug 216 project inside combustion chamber 211 while piston 21 is located at its upper-dead position.

The operation of the above arrangement will be described below. During the intake stroke wherein intake valve 6 is moved downward and intake port 6 is opened during the operation of the engine, intake air is guided into cylinder chamber 2 through intake valve seat 7 and a swirl is forcibly formed along its circumferential direction. This air flow is mixed with fuel-injected from injection nozzle 215 (in this embodiment, not diesel oil normally used in a diesel engine but alcohol), and is combusted by energy due to spark of spark plug 216 and compression energy.

Controller 35 selects the swirl ratios of H, M, and L shown in FIG. 30 in accordance with the engine speed and the load, thereby operating drive mechanism 31 accordingly.

INDUSTRIAL APPLICABILITY

As described above, a variable swirl intake apparatus of an engine according to the present invention is effective for a direct injection type diesel engine or an engine using alcohol as fuel, and and is suitable for an intake apparatus of the HSP structure, in which the mixing state of air and fuel is improved, thereby improving a combustion efficiency.

We claim:

1. A variable swirl intake apparatus for an engine, comprising;
    an intake port formed in a cylinder head of the engine and including an entrance portion extending from a side surface of the cylinder, and a swirl chamber which communicates with the entrance portion and is formed to impart a swirl to an air flow introduced from the entrance portion, said swirl chamber having an opening which opens onto a lower surface of the cylinder head and communicates with a cylinder chamber;
    a valve seat formed in the lower surface of the cylinder head along the peripheral edge of the opening of the swirl chamber;
    an intake valve for opening and closing the opening of the swirl chamber in association with the valve seat;
    a swirl control path formed in the cylinder head, for introducing air into the cylinder chamber so as to control a swirl within the cylinder chamber, the swirl control path having one end opening to that region of the opening which is located at a side of the entrance portion with respect to a line extending through a center of the opening and the center of the cylinder chamber, and another end opening to the side surface of the cylinder head;
    an intake manifold connected to the cylinder head, for introducing air into the intake port and the swirl control path, the intake manifold having a main branch pipe communicating with the intake port, and a sub branch pipe communicating with the swirl control path; and
    a control apparatus for controlling the amount of air flowing into the swirl control path, the control apparatus having a valve, arranged in the intake manifold, for opening and closing the sub branch pipe, a drive mechanism for driving the control valve, and means for actuating the drive mechanism.

2. An apparatus according to claim 1, wherein said actuating means includes detection means for detecting an operating condition of the engine, and control circuit means for determining the strength of a swirl in accordance with a signal from the detection means, and controlling the drive mechanism so as to obtain a determined swirl strength.

3. An apparatus according to claim 2, wherein said detection means has a first sensor for detecting the rotational speed of the engine, and a second sensor for detecting the engine load.

4. An apparatus according to claim 2, wherein said control circuit means sets a high swirl in the case of low-speed, high and middle load states, sets a middle swirl in the case of a low speed, low-load state and middle-speed, high and middle states, and sets a low swirl in the case of a middle-speed, low-load state and a high-speed, overall-load state.

5. An apparatus according to claim 2, wherein when a low temperature state of the engine is detected by the detection means, said control circuit means sets a middle swirl in the case of low and middle speeds, high and middle load states, and sets a low swirl in other operating states.

6. An apparatus according to claim 2, wherein when a rate of changing of the rotational speed of the engine exceeds a given value, said control circuit means sets a high swirl in the case of low-speed, low and middle load states, and sets a low swirl in other operating states.

7. An apparatus according to claim 1, wherein said intake manifold includes a merge portion, said main branch pipe is connected to the merge portion, and said sub branch pipe is connected to the merge portion and located above the main branch pipe.

* * * * *

UNITED STATES PATENT AND TRADEMARK OFFICE
CERTIFICATE OF CORRECTION

PATENT NO. : 4,909,210

DATED : March 20, 1990

INVENTOR(S) : Taizo Shimada et al

It is certified that error appears in the above-identified patent and that said Letters Patent is hereby corrected as shown below:

On the title page item [30] all Foreign Applciation Priority Data should be deleted.

[30] Foreign Application Priority Data

| Mar. 23, 1984 | [JP] | Japan | 59-55313 |
| Mar. 26, 1984 | [JP] | Japan | 59-42972[U] |
| Mar. 26, 1984 | [JP] | Japan | 59-42971[U] |
| Apr. 13, 1984 | [JP] | Japan | 59-74692 |
| Aug. 14, 1984 | [JP] | Japan | 59-124142 |
| Aug. 14, 1984 | [JP] | Japan | 59-124143 |

[51] Int. Cl.$^4$ ............ F02B 31/00; F02B 35/10
[52] U.S. Cl. ............ 123/308; 123/188 M
[58] Field of Search ............ 123/306, 308, 188 M, 123/251

Signed and Sealed this

Fifth Day of May, 1992

Attest:

DOUGLAS B. COMER

*Attesting Officer*     *Acting Commissioner of Patents and Trademarks*